(12) United States Patent (10) Patent No.: US 12,683,430 B2
Davies et al. (45) Date of Patent: Jul. 14, 2026

(54) IN-LINE DEVICE AND A METHOD FOR CONTROLLING AN ELECTRICAL APPLIANCE

(71) Applicants:Green Running Limited, Bath (GB); Austin Consultants Limited, Bath (GB)

(72) Inventors: Peter Davies, Bath (GB); Konstantine Dimitrov, Bath (GB); Christopher Anthony Thoroughgood, Bath (GB)

(73) Assignees: Green Running Limited, Bath (GB); Austin Consultants Limited, Bath (GB)

( * ) Notice: Subject to any disclaimer, the term of this patent is extended or adjusted under 35 U.S.C. 154(b) by 435 days.

(21) Appl. No.: 17/621,022

(22) PCT Filed: Jun. 18, 2020

(86) PCT No.: PCT/EP2020/067017
§ 371 (c)(1),
(2) Date: Dec. 20, 2021

(87) PCT Pub. No.: WO2020/254525
PCT Pub. Date: Dec. 24, 2020

(65) Prior Publication Data
US 2022/0337081 A1 Oct. 20, 2022

(30) Foreign Application Priority Data

Jun. 18, 2019 (GB) ...................................... 1908684
Oct. 2, 2019 (NL) ...................................... 2023933

(51) Int. Cl.
H02J 13/13 (2026.01)
H02J 3/14 (2026.01)
(Continued)

(52) U.S. Cl.
CPC ................ H02J 13/13 (2026.01); H02J 3/14 (2013.01); H02J 13/10 (2026.01); H02J 13/12 (2026.01); H02J 13/38 (2026.01); H02J 2105/51 (2026.01)

(58) Field of Classification Search
CPC .. H02J 13/00006; H02J 3/14; H02J 13/00001; H02J 13/00002; H02J 13/0005;
(Continued)

(56) References Cited

U.S. PATENT DOCUMENTS 4,977,515 A 12/1990 Rudden et al.
8,106,765 B1 * 1/2012 Ackerson ................ H02J 3/381
340/657
(Continued)

FOREIGN PATENT DOCUMENTS

CN 108242824 A 7/2018
EP 3 358 692 A1 8/2018
(Continued)

OTHER PUBLICATIONS

Draper Tools Ltd .: "24 Hour Mechanical Timer." Sep. 30, 2007 URL:https://www.tooled-up.com/artwork/ProdPDF/44914ins.pdf.
(Continued)

*Primary Examiner* — Rami R Okasha
(74) *Attorney, Agent, or Firm* — Blank Rome LLP

(57) ABSTRACT

A control and monitoring device integrated in an intermediary coupling unit, said intermediary coupling unit being configured to couple an electrical appliance to a power supply, said control and monitoring device comprising a control module configured to change a status of the electrical appliance; a sensor configured to monitor a condition of said electrical appliance and/or an environment thereof; and a processor configured to instruct the control module to change a status of the electrical appliance based on an output
(Continued)

of the sensor. Complementary devices and methods of operating such devices are also presented herein.

16 Claims, 14 Drawing Sheets

(51) Int. Cl.
| | | |
|---|---|---|
| *H02J 13/10* | (2026.01) |
| *H02J 13/12* | (2026.01) |
| *H02J 13/38* | (2026.01) |
| *H02J 105/50* | (2026.01) |

(58) Field of Classification Search
CPC .. H02J 2310/58; Y02B 70/30; Y02B 70/3225; Y02B 90/20; Y02E 60/00; Y04S 10/30; Y04S 20/222; Y04S 20/242; Y04S 40/12
See application file for complete search history.

(56) References Cited

U.S. PATENT DOCUMENTS

| | | | |
|---|---|---|---|
| 2009/0289507 A1 | 11/2009 | Shiu | |
| 2010/0085144 A1* | 4/2010 | Aisa | G05B 19/0423 |
| | | | 340/3.1 |
| 2011/0098867 A1* | 4/2011 | Jonsson | G06F 1/3209 |
| | | | 700/295 |
| 2011/0276289 A1* | 11/2011 | Park | G01R 21/133 |
| | | | 702/62 |
| 2012/0139348 A1* | 6/2012 | DuBose | G06F 1/263 |
| | | | 307/80 |
| 2012/0143387 A1* | 6/2012 | Indovina | H02J 13/00 |
| | | | 700/297 |
| 2012/0166114 A1* | 6/2012 | Liu | G01R 21/133 |
| | | | 702/60 |
| 2012/0201062 A1 | 8/2012 | Lee | |
| 2016/0013676 A1* | 1/2016 | Kaji | H02J 3/32 |
| | | | 320/134 |
| 2016/0372923 A1* | 12/2016 | Behrangrad | H04L 63/1466 |
| 2017/0149180 A1 | 5/2017 | Siegler | |
| 2017/0293000 A1 | 10/2017 | Kim et al. | |
| 2018/0152769 A1* | 5/2018 | Kotowski | G08C 17/00 |
| 2019/0229553 A1* | 7/2019 | De Vries | H02J 13/00006 |
| 2021/0118629 A1* | 4/2021 | Burkett | B60L 50/60 |

FOREIGN PATENT DOCUMENTS

| | | |
|---|---|---|
| WO | WO 96/36953 A1 | 11/1996 |
| WO | WO 2008/090432 A1 | 7/2008 |
| WO | WO 2010/022487 A2 | 3/2010 |
| WO | WO 2014/030120 A1 | 2/2014 |

OTHER PUBLICATIONS

Darrell Morris, "PowerMaster Plug-In Mechanical Timer." Nov. 23, 2016. URL:https://www.sitebox.ltd.uk/docs/toolstream/pdf/manuals/148232_Z1MANPRO1.PDF.

D.B. Ferry et al., "Graphene based multifunctional flame sensor", Nanotechnology, vol. 26, 195502, 10.1088/0957-4484/26/19/195502, IOP Publishing (2015).

* cited by examiner

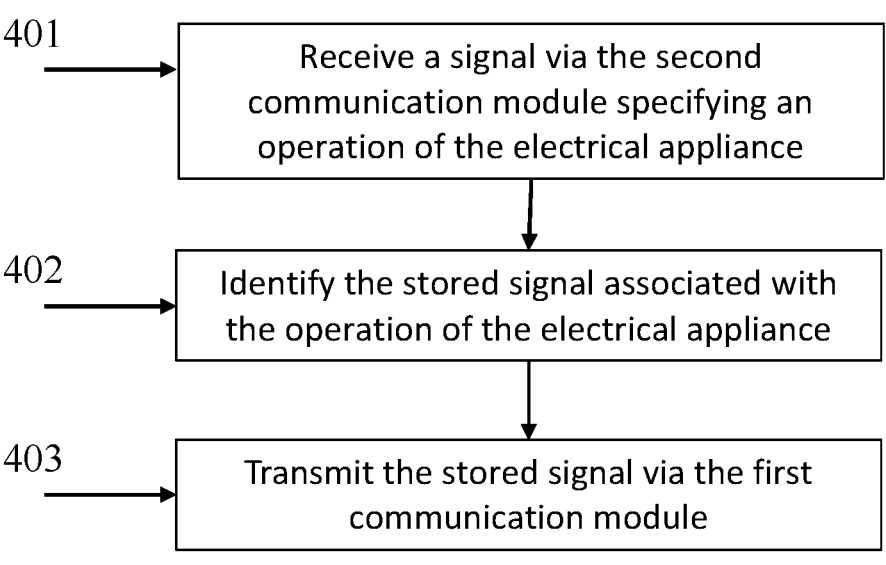

401 → Receive a signal via the second communication module specifying an operation of the electrical appliance 402 → Identify the stored signal associated with the operation of the electrical appliance 403 → Transmit the stored signal via the first communication module

Fig. 4A

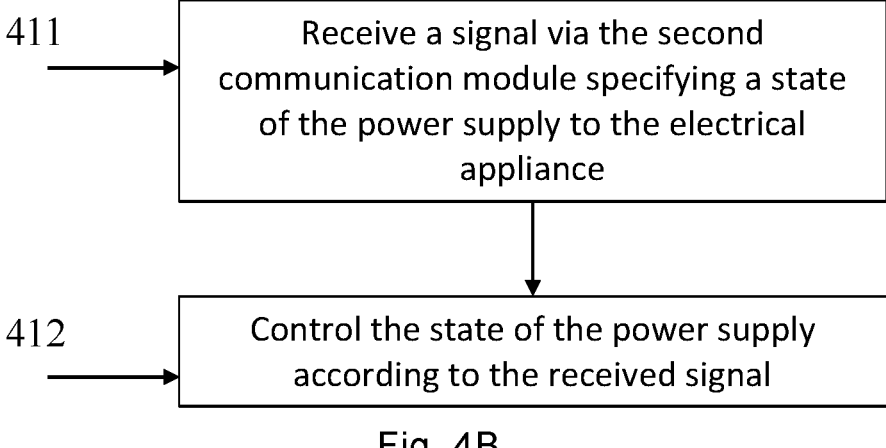

411 → Receive a signal via the second communication module specifying a state of the power supply to the electrical appliance 412 → Control the state of the power supply according to the received signal

Fig. 4B

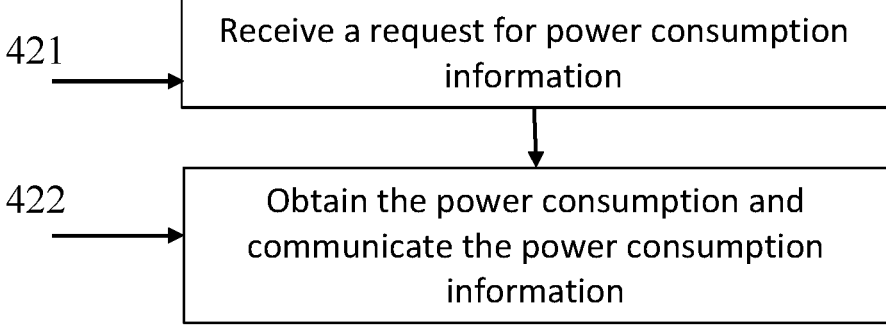

421 → Receive a request for power consumption information

422 → Obtain the power consumption and communicate the power consumption information

Read the temperature sensor

602

No    Is the measured temperature greater than a predetermined value?

603

Yes

Instruct change in status

Power supply

Appliance

S901　Receive a demand response signal

S902　Change a status of the electrical appliance

S903　Receive a signal to resume operation of the electrical appliance

S904　Change a status of the electrical appliance

S905　Determine an amount of shifted energy consumption

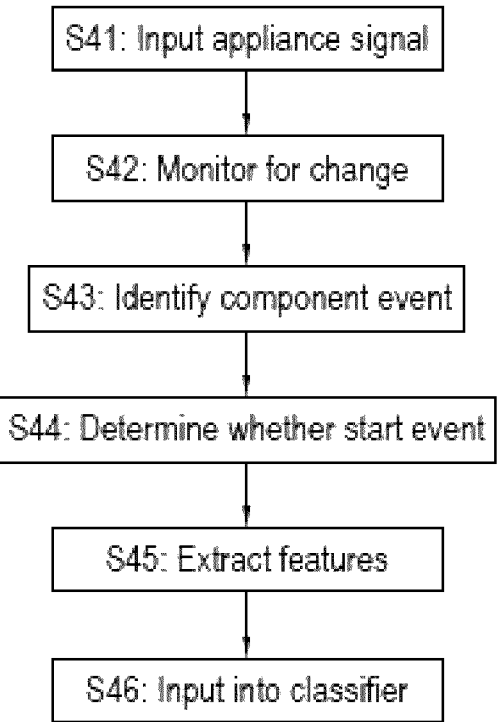
1201
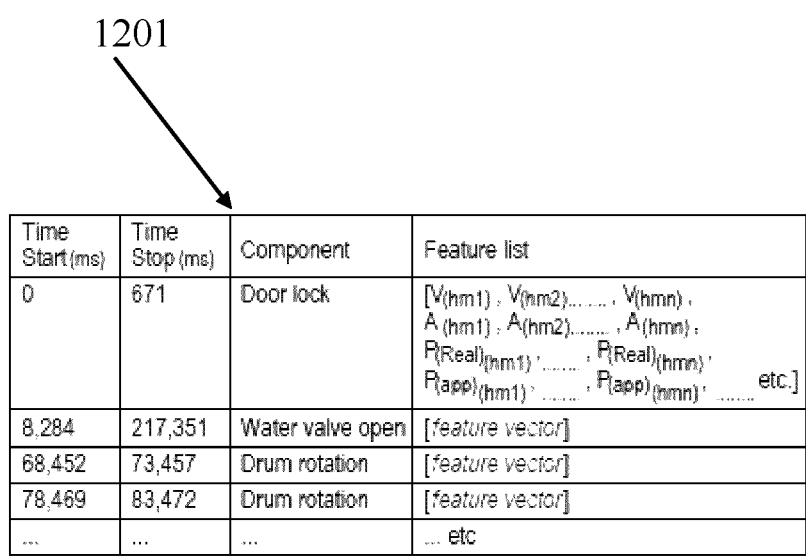
| Time Start (ms) | Time Stop (ms) | Component | Feature list |
|---|---|---|---|
| 0 | 671 | Door lock | $[V_{(hm1)}, V_{(hm2)}, \ldots, V_{(hmn)}, A_{(hm1)}, A_{(hm2)}, \ldots, A_{(hmn)}, P_{(Real)(hm1)}, \ldots, P_{(Real)(hmn)}, P_{(app)(hm1)}, \ldots, P_{(app)(nmn)}, \ldots$ etc.] |
| 8.284 | 217,351 | Water valve open | [feature vector] |
| 68,452 | 73,457 | Drum rotation | [feature vector] |
| 78,469 | 83,472 | Drum rotation | [feature vector] |
| ... | ... | ... | ... etc |
Fig. 12

IN-LINE DEVICE AND A METHOD FOR CONTROLLING AN ELECTRICAL APPLIANCE

TECHNICAL FIELD

The present disclosure relates to a method for controlling an electrical appliance and to an in-line device.

BACKGROUND

In-line devices are located along the power cable for various electrical appliances. Such devices may include a switch, which may be manually operated by the user to switch the electrical appliance between an on and off state. Such devices are limited in that they rely on a manual user input at the in-line device in order to initiate a change in status of the electrical appliance between an on and off state.

BRIEF DESCRIPTION OF THE DRAWINGS

Arrangements of the present invention will be understood and appreciated more fully from the following detailed description, made by way of example only and taken in conjunction with drawings in which:

FIG. 4A shows a method of controlling operation of an electrical appliance according to an embodiment;

FIG. 4B shows a method of controlling operation of an electrical appliance according to an embodiment;

FIG. 4C shows a method of communicating power consumption information which may be performed by a device according to an embodiment;

FIG. 12 shows a method of determining a device type according to an embodiment;

DETAILED DESCRIPTION

Figure 1A:
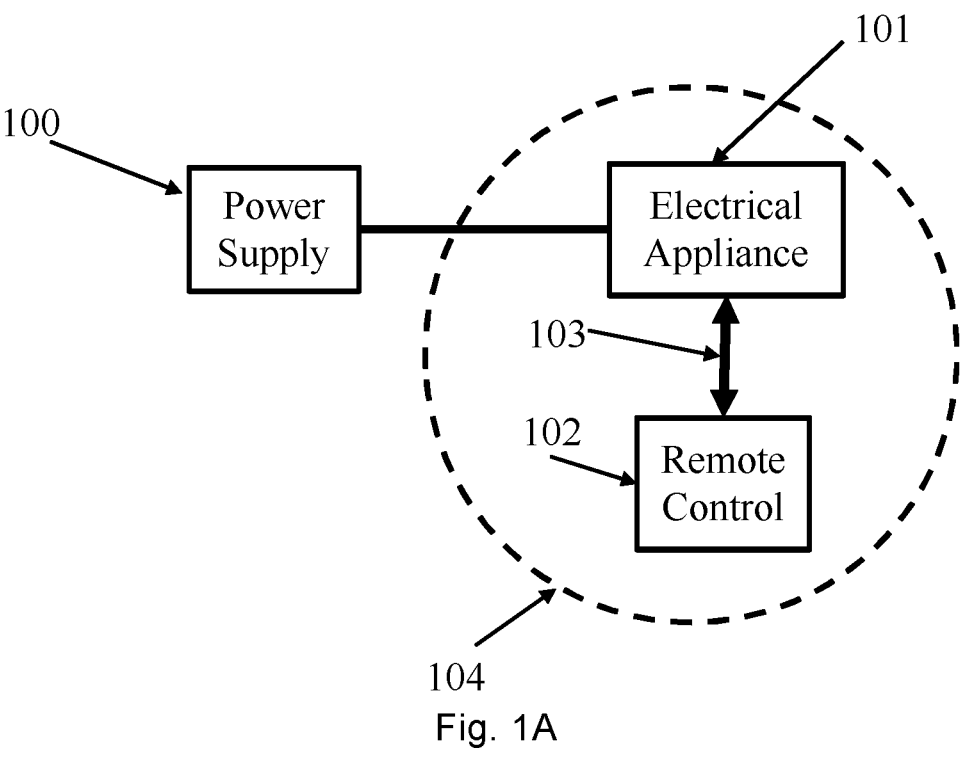
FIG. 1A shows an example system for the remote control of an electrical appliance.

According to a first aspect there is provided a control and monitoring device integrated in an intermediary coupling unit, wherein the intermediary coupling unit is configured to couple an electrical appliance to a power supply. The control and monitoring device comprises a control module configured to change a status of the electrical appliance, a sensor configured to monitor a condition of said electrical appliance and/or an environment thereof; and a processor configured to instruct the control module to change a status of the electrical appliance based on an output of the sensor.

In the first aspect, and other subsequently mentioned aspects, of the present disclosure, the control and monitoring device is also referred to as an in-line device. The inventors considered it to be advantageous that the device according to the present disclosure be integrated within the Intermediary coupling unit. Within the scope of the present disclosure, it is understood by the skilled person that the term intermediary is used to refer to a position of the coupling unit in between an mains power supply and the electrical appliance. For example, such an intermediary coupling unit is a wall socket as found in residential or commercial buildings. Such a wall socket may comprise plug outlets for connecting an electrical appliance to the mains power supply. Alternately, the device according to the present disclosure could be situated along the cable.

The skilled person understands that by integrating the device into the intermediary coupling unit, the device is able to control and monitor any type of electrical appliance that maybe connected to it.

In an embodiment the control module comprises a switch that is configured to connect the power supply to the electrical appliance in a first configuration and disconnect the power supply from the electrical appliance in a second configuration.

In a further embodiment the control module comprises a first communication module configured to transmit a control signal to the electrical appliance, wherein the control signal controls the operation of the electrical appliance.

In an embodiment the sensor comprises a voltage sensor configured to measure a voltage supplied through the in-line device to the electrical appliance and a current sensor configured to measure a current supplied through the in-line device to the electrical appliance.

In a further embodiment a power signal supplied to the electrical appliance is determined from the voltage measured by the voltage sensor and the current measured by the current sensor. In this embodiment the processor instructs the control module based on detection of a feature in the power signal.

In an embodiment the sensor comprises a temperature sensor and the processor instructs the control module to change the status of the electrical appliance to a power off status when a reading from the temperature sensor exceeds a predetermined threshold.

According to a second aspect there is provided an in-line device located along a cable which is configured to couple an electrical appliance to a power supply. The in-line device comprises: a first communication module configured to transmit a control signal to an electrical appliance, a second communication module configured to receive a user signal from a first user device; and a processor. The processor configured to: in response to receiving a user signal from the first user device, select a control signal from one or more control signals to transmit to the electrical appliance, wherein, when received at the electrical appliance, the control signal controls the operation of the electrical appliance.

In an embodiment the in-line device further comprises a switch configured to connect the power supply to the electrical appliance in a first configuration and disconnect the power supply from the electrical appliance in a second configuration. In this embodiment the processor is further configured to, in response to receiving a user signal from the first user device, control the switch.

In a further embodiment the first communication module is further configured to receive a control signal from a second user device. In this embodiment the processor is further configured to select a user prompt corresponding to a first operation of the electrical appliance. In response to receiving a first control signal from the second user device after the prompt, the processor is configured to store information specifying the first control signal in relation to the first operation and in response to receiving a user signal from the first user device specifying the first operation, select the first control signal to transmit to the electrical appliance.

In an embodiment the control signal from the second user device causes the electrical appliance to be turned on or off. In a further embodiment the control signal causes an appliance to be configured in a 'stand-by' power consumption mode.

In an embodiment the electrical appliance is a heating, ventilation and/or air conditioning unit and the first operation comprises one of: increasing an output temperature of the unit; or decreasing an output temperature of the unit.

According to a third aspect there is provided a method for controlling operation of an electrical appliance. The method comprises receiving, at an in-line device located along a cable which couples an electrical appliance to a power supply, a user signal from a first user device via a second communication module, selecting a control signal from one or more control signals and transmitting the control signal to the electrical appliance via a first communication module wherein, when received at the electrical appliance, the control signal controls the operation of the electrical appliance.

In an embodiment the method further comprises selecting a user prompt corresponding to a first operation of the electrical appliance, receiving a first control signal from a second user device in response to the user prompt and storing information specifying the first control signal in relation to the first operation.

In a further embodiment the method comprises receiving a user signal from a first user device specifying the first operation and transmitting the first control signal via the first communication module to the electrical appliance.

According to a fourth aspect there is provided an in-line device located along a cable which is configured to couple an electrical appliance to a power supply. The in-line device comprising a voltage sensor configured to measure a voltage supplied through the device to the electrical appliance, a current sensor configured to measure a current supplied through the device to the electrical appliance; and a processor. The processor configured to obtain data from the voltage sensor and the current sensor measurements and monitor the data for a first feature.

In an embodiment the first feature corresponds to a fault in the electrical appliance.

In an embodiment the in-line device further comprising a communication module configured to receive information identifying the first feature.

In an embodiment the in-line device further comprises a control module configured to change a status of the electrical appliance.

In an embodiment, in response to identifying the first feature in the data, the processor is configured to instruct the control module to change a status of the electrical appliance to a power off status.

In an embodiment the communication module is configured to transmit data and, in response to identifying the first feature in the data, the processor is configured to instruct the communication module to begin transmitting data.

In an embodiment the communication module is configured to transmit data, and, upon identifying the first feature in the data, the processor is further configured to: instruct the communication module to transmit data if a communication link exists and instruct the control module to change a status of the electrical appliance to a power off status if a communication link does not exist.

According to a fifth aspect there is provided an in-line device located along a cable which is configured to couple an electrical appliance to a power supply. The in-line device comprising a control module configured to change a status of the electrical appliance, a voltage sensor configured to measure a voltage signal supplied through the device to the electrical appliance, a current sensor configured to measure a current signal supplied through the device to the electrical appliance and a processor. The processor configured to instruct the control module to change a status of the electrical appliance based on a demand response signal.

In an embodiment the processor is further configured to obtain frequency data from the voltage sensor and the current sensor measurements, and, generate a demand response signal when the frequency is lower than a predetermined value.

In an embodiment the in-line device further comprises a communication module configured to receive a demand response signal.

In a further embodiment, in response a demand response signal, the processor of the inline device is configured to instruct the control module to change a status of the electrical appliance to a power off status.

According to a sixth aspect there is provided an in-line device located along a cable that is configured to couple an electrical appliance to a power supply. The in-line device comprising: a control module configured to change a status of the electrical appliance, a voltage sensor configured to measure a voltage supplied through the in-line device to the electrical appliance, a current sensor configured to measure a current supplied through the in-line device to the electrical appliance, a communication module, configured to transmit data and receive a signal; and a processor. The processor configured to: obtain data from the voltage sensor and current sensor measurements and instruct the communication module to transmit the data, and instruct the control module to change the status of the electrical appliance based on a received signal.

The methods are computer-implemented methods. Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal. The carrier medium may comprise a non-transitory computer readable storage medium.

According to an embodiment, there is provided a carrier medium comprising computer readable code configured to cause a computer to perform any of the above methods. FIG. 1A shows an example system for providing remote control of an electrical appliance. FIG. 1A shows an electrical appliance 101 that is connected to a power supply 100. The electrical appliance 101 is communicatively coupled via a first communication link 103 to a remote control 102. FIG.

1A shows an area 104 within which the electrical appliance 101 is able to receive and respond to signals transmitted by the remote control 102 via the first communication link 103. If the remote control 102 is located outside of the area 104 it is not possible to control the electrical appliance 101 using the remote control. The system shown in FIG. 1A may additionally or alternatively be limited in other ways, for example where the remote control 102 uses a first communication link 103 that requires line-of-sight (e.g. Infra-red). In this case, if the remote control 102 is not within the line of sight of the appliance 101, it is not possible to control the appliance 101, even though the remote control 102 might be within the area 104.

Many electrical appliances are connected to the internet. In contrast to appliances that are controlled by short range and/or line of sight communications, internet enabled devices can be controlled by a user anywhere in the world, provided the user has a connection to the internet. However, in domestic and industrial settings there may be existing electrical appliances which are not internet enabled. Furthermore, it may be difficult to modify the design model of an existing electrical appliance to include internet connectivity.

Figure 1B:
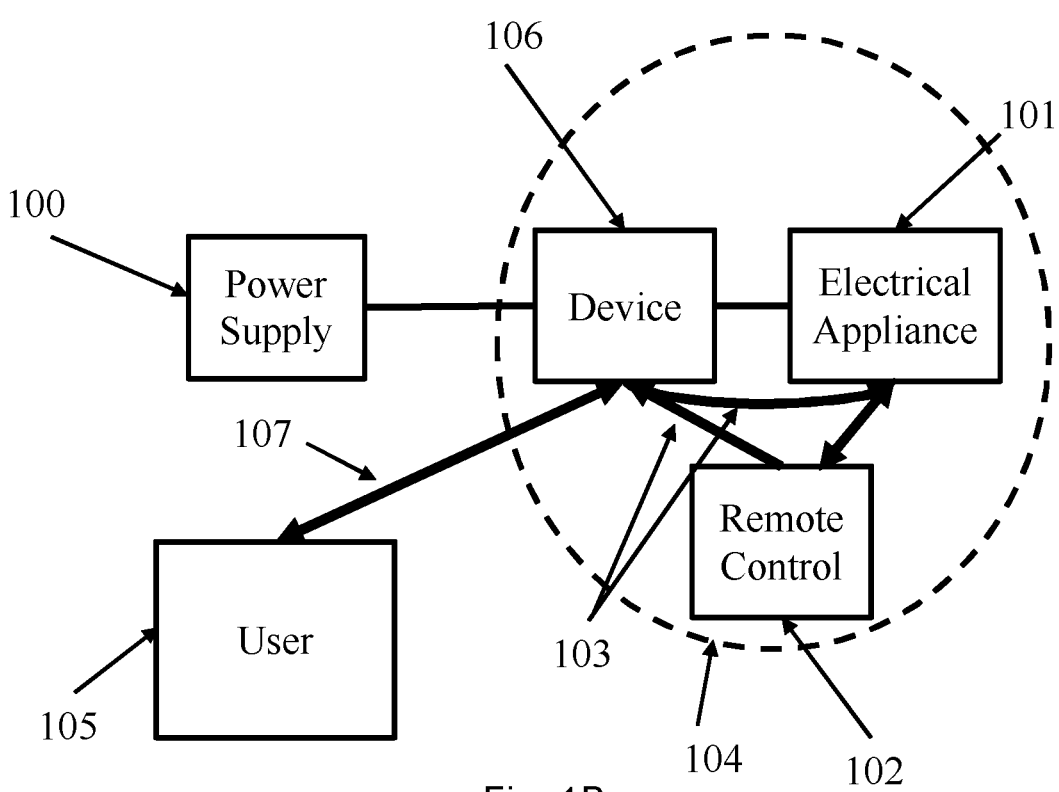
FIG. 1B shows an example system comprising a device according to an embodiment.

FIG. 1B shows a schematic illustration of an example system comprising an in-line device 106 according to an embodiment. In this figure, the same reference numerals are used for the corresponding features of FIG. 1A, and a description of the like features is omitted. FIG. 1B shows a device 106 that is configured to be coupled between a power supply 100 and an electrical appliance 101. In this specification, a "power supply" may be any source of electrical power. This includes an Alternating Current (AC) power supply or a Direct Current (DC) power supply. The AC or DC electricity from the power supply passes through the device 106 to the appliance 101. The power supply may be a mains power supply from the electricity grid or a power supply provided by a generator for example.

The electrical appliance 101 may be any type of electric appliance, including but not limited to: boilers, immersion heaters, heat pumps, boiler pumps, washing machines, tumble dryers, dish washer, fridges, freezers, electric heaters, air conditioners, fans, electric ovens, electric hobs, microwave ovens, toasters, kettles, coffee makers blenders and food processors, hair dryers, curlers and straighteners, irons, power showers and heating, ventilation, and air conditioning (HVAC) units. Appliances with a DC power supply may include emergency lightning or intruder alarms for example.

The device 106 allows a user to control operation of the electrical appliance 101 from a remote user device 105. The user device 105 communicates with the device 106 via a second communication link 107. The user may control operation of the electrical appliance 101 by transmitting a user signal via the second communication link 107 instructing selection of a control signal from one or more stored control signals at the device 106. A control signal may then be transmitted from the device 106 to the electrical appliance 101 via the first communication link 103. When received at the electrical appliance, the control signal controls the operation of the electrical appliance 101. In this manner, operation of the electrical appliance 101 may be controlled from a user device 105 via the device 106. Operation of the device 106 may therefore be controlled without the limitations of the remote control 102 (e.g. shorter range).

The device 106 further comprises an electrical switch 202, controlled by a processor 204. The user may turn the electrical appliance 101 on and off by transmitting a user signal via the second communication link 107 instructing control of the switch 202.

The functionality and the configuration of the device 106 will be discussed in more detail later in the description. The device 106 is configured to communicate with a remote control 102 and an electrical appliance 101 via a first communication link 103. The device 106 is also configured to communicate with a user device 105 via a second communication link 107. The user device 105 may monitor and control the electrical appliance 101 whilst outside the range 104 of the first communication link 103 with the electrical appliance 101.

The first communication link 103 and the second communication link 107 are different, and use different methods of communication. The first communication link 103 and the second communication link 107 may operate in accordance with any communications standard. Furthermore, each communication link may comprise multiple different communication protocols. The second communication link 107 may have additional capability relative to the first communication link 103, for example it may operate over a larger area.

For example, the first communication link 103 may operate a wireless short-range communication protocol (e.g. infra-red or Bluetooth) while the second communication link 107 may comprise internet based protocols and wireless access protocols (e.g. a communication link which uses WiFi to connect to the internet). Given the widespread use of infra-red remote controls it is foreseen that in one embodiment the first communication link 103 operates in the infra-red spectrum where the timing and length of infra-red pulses are used to encode a message. The user device may be any Internet enabled device, for example a mobile phone, tablet, PC or laptop.

Figure 2:
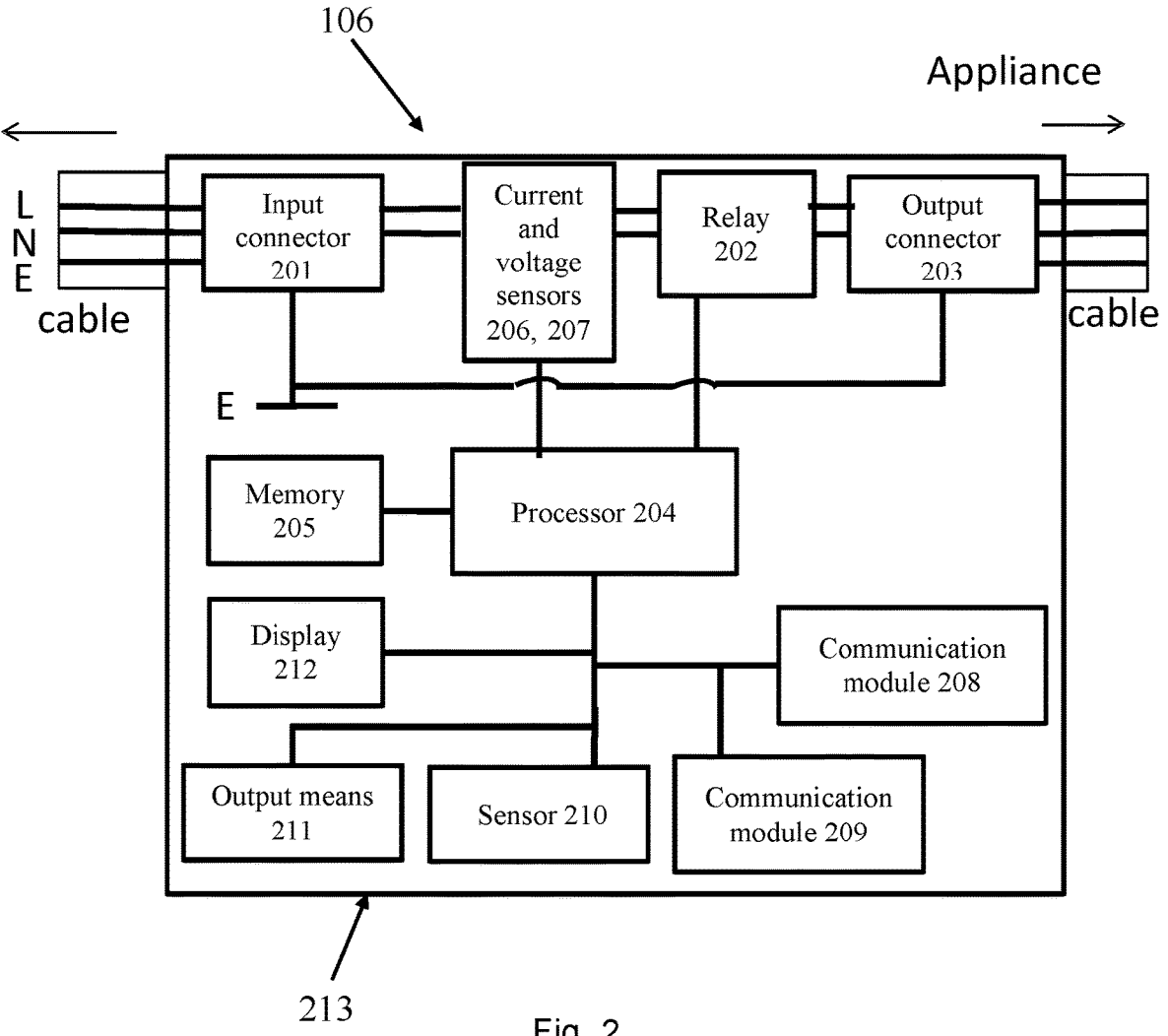
FIG. 2 shows a device according to an embodiment.

FIG. 2 shows a schematic illustration of an in-line device located along a cable according to an embodiment. The cable is configured to couple an electrical appliance to a power supply. The device is connected partway along a cable connecting between a plug and the electrical appliance 101 for example. The components are located within a housing 213. Such a housing 213 is, for example, the wall power supply commonly found in domestic and commercial constructions, to which any electrical appliance may be connected.

Alternately, the housing 213, may be a dedicated housing for a particular electrical appliance such as commonly used for electrical appliances requiring a dedicated type of power supply such as, for example, Air condition units, Central heating units, Boilers, Induction cooking stoves etc. The skilled person understands that the intermediary coupling unit and the housing 213 thereof may be dependent on the type of electrical appliance in question. For certain types of appliances, for example air conditioning units, rotary isolators may be required. In such situations, the intermediary coupling unit is to be understood as the rotary isolator or as the corresponding coupling unit required for the electrical appliance in question.

As explained above, the electrical appliance 101 may be any type of electric appliance, including but not limited to: boilers, immersion heaters, heat pumps, boiler pumps, washing machines, tumble dryers, dish washer, fridges, freezers, electric heaters, air conditioners, fans, electric ovens, electric hobs, microwave ovens, toasters, kettles, coffee makers blenders and food processors, hair dryers, curlers and straighteners, irons, power showers and heating, ventilation, and air conditioning (HVAC) units. Appliances with a DC power supply may include emergency lightning or intruder alarms for example.

The device 106 comprises an input connector 201. The input connector 201 could be any type of connector which is suitable for coupling the device 106 to a power cable for example. The input connector 201 may be a terminal block comprising three connections which connect to the live, earth and neutral wires of an input power cable. At the other end, the input power cable may terminate in a plug which is configured to connect with a mains power socket for example. Alternatively the input connector 201 may comprise only two connections for the live and neutral wires of an input power cable.

The input connector 201 is connected to current 206 and voltage sensors 207. These may be housed in a single unit as shown, or may comprise multiple separate components. The current sensor 206 is configured to measure current supplied through the device 106 to the electrical appliance 101, and the voltage sensor 207 is configured to measure voltage supplied through the device 106 to the electrical appliance 101. The current 206 and voltage sensors 207 are electrically connected to the live and/or neutral line, between the input connector 201 and an output connector 203. As shown, further components, including a relay switch 202 in this example, may optionally be coupled between the input connector 201 and the output connector 203. The current sensor 206 is configured to measure the electrical current between the input connector 201 and the output connector 203. The current sensor may be a differential type sensor (such as a differential Hall Effect sensor), a magnetic pick-up device using a current sensing inductor, or a low value resistor for example. Although in FIG. 2 the current sensor 206 is positioned prior to the relay 202 it is emphasized that the current sensor 206 could be positioned anywhere between the input connector 201 and the output connector 203. The voltage sensor 207 is also connected between the input connector 201 and the output connector 203. The voltage sensor 207 may be any component that outputs a low voltage signal that is representative and proportional to the input voltage, for example a voltage divider. The voltage sensor 207 may comprise three resistors for example. Again, the voltage sensor 207 may be positioned anywhere between the input connector 201 and the output connector 203. A mains signal may comprise a single phase signal comprising a single current and voltage signal, a split phase (or dual phase) signal comprising two current signals and two voltage signals, or a three phase signal comprising three current signals and three voltage signals.

The connections present within the input connector 201 and the output connector 203 will depend on the type of mains power signal provided to the in-line device and the type of power signal used by the electrical appliance. For example, in the case where an appliance only uses a single phase of a three phase supply (i.e. it is a single phase load), the input connector 201 and the output connector 203 will at least include a live connection and a neutral connection. This situation is most common where the in-line device is connected to equipment in office buildings and apartment blocks.

If, on the other hand, the electrical appliance uses all three phases of a three phase power supply (i.e. it is a three phase load), the input connector 201 and the output connector 203 will have connections for each phase of the power supply and may, or may not, have a neutral connection depending on whether the three phase mains signal is distributed in a star or a delta configuration.

Each signal may be measured by a current or voltage sensor and analysed in order to monitor performance of the appliance. For example, in a split phase system there is a Live1, Live2 and Neutral signal pair, and there is a sensor pair for each voltage.

The current sensor 206 is configured to measure current at a first sampling frequency and the voltage sensor 207 is configured to measure voltage at a second sampling frequency. The second sampling frequency may be greater than or equal to 1 MHz for example. The first and second sampling frequency may be the same. Thus the current and voltage sensors may sample the current and voltage supplied to the electrical appliance 101 at a read or sampling frequency, generating current and voltage data. In an embodiment, the current and voltage sensors read at rates between a hundred times per second and ten million times per second, depending on the appliance requirements and determined by the processor 204 or by external sources communicating with the processor 204. The output from the voltage sensor 207 and the current sensor 206 may be digitized by one or more analogue to digital converters (ADC) and the resultant output of the ADC is passed on to the processor 204. Optionally the ADC may be contained within the processor 204.

The relay 202 is configured to control the supply of power between the input connector 201 and the output connector 203. The relay 202 is a component of a control module (not shown). The relay is a switch configured to connect the power supply to the electrical appliance in a first configuration and disconnect the power supply from the electrical appliance in a second configuration. It changes the status of the electrical appliance between power on and power off.

In FIG. 2 the output of the relay 202 is connected to the output connector 203. The output connector 203 could be any type of connector which is suitable for coupling the device 106 to a second cable connected to an electrical appliance 101. The output connector 203 may be a terminal block comprising three connections for the live, earth and neutral wires. The output connector may connect to one end of a cable which at its other end is connected to a power supply input of the electrical appliance 101. The output connector 304 is optionally configured for higher appliance current.

The device 106 also comprises a processor 204 which, upon execution of computer readable instructions, is configured to implement the functionality described herein. The processor 204 is connected to a memory 205. The memory 205 may be a non-volatile memory which is configured to store computer readable instructions amongst other things. The processor may comprise logic circuitry that responds to and processes the instructions.

The processor 204 is also communicatively coupled to the relay 202. The processor 204 is configured to control the supply of power between the input connector 201 and the output connector 203 by controlling the configuration of the relay 202. The processor 204 may control the relay 202 in order to switch the power supply to the electrical appliance 101 "on" and "off". An example method in which the processor 204 instructs the relay 202 to change the status of the electrical appliance based on the output of the current and voltage sensors 206 and 207 is described in relation to FIG. 11. An example method in which the processor 204 instructs the relay 202 to change the status of the appliance based on the output of the sensor 210 is described in relation to FIG. 6. An example method in which the processor 204 instructs the relay 202 to change the status of the appliance based on a received signal at the second communication module 209 is described in relation to FIG. 4C.

The device 106 may comprise a plurality of sensors 210 that are configured to monitor an ambient operating conditions of the electrical appliance. The present disclosure further elaborates the specific condition wherein the sensor 210 is a temperature sensor. It is the insight of the inventors that it may be advantageous to also monitor other parameters that may influence the working of the electrical appliance. For example, monitoring the ambient humidity when the electrical appliance is an air conditioning unit, or monitoring the carbon monoxide levels when the electrical appliance is a boiler, in order to ensure safe operation.

As a way of example, the sensor may be a microphone configured to capture audio noise signals from the operating environment. Such a microphone may also capture the noise emanating from the electrical appliance. By providing this information to the processor 204, the device 106 is capable of correlating the power drawn with the noise levels in order to detect any anomaly or defect in the electrical appliance.

The processor is communicatively coupled to the current sensor 206 and the voltage sensor 207. The processor 204 is also configured to receive the current measurements from the current sensor 206. In addition the processor 204 is also configured to receive the voltage measurements from the voltage sensor 207. The processor 204 may process the current and voltage data to determine one or more of the following: a live power consumption, an average power consumption, a cumulative power consumption over a predetermined period of time, an energy cost for a predetermined period of time, a device type, and a device status. How these may be calculated will be described later.

The processor 204 is communicatively coupled to a first communication module 208 and a second communication module 209. The first communication module 208 is configured to transmit a control signal to the electrical appliance 101. The first communication module 208 is a component of a control module (not shown). It is configured to change a status of the electrical appliance. The first communication module 208 is configured to communicate with the electrical appliance 101 using the same communication protocol as a remote control for said electrical appliance. The first communication module 208 may also be configured to receive signals from a remote control of the electrical appliance. The first communication module 208 is an infra-red emitter and receiver in this example, however as described above, other types of communication modules 208 may be used.

Figure 11:
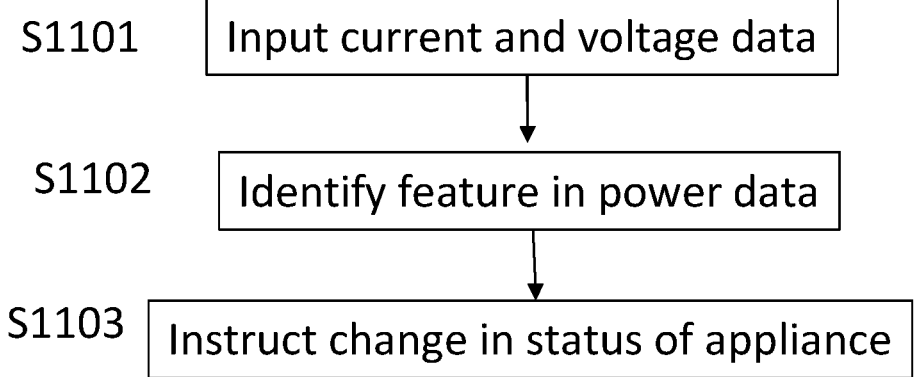
FIG. 11 shows a method of condition monitoring performed at an in-line device according to an embodiment.

An example method in which the processor 204 instructs the first communication module 208 to change the status of the electrical appliance based on the output of the current and voltage sensors 206 and 207 is described in relation to FIG. 11. An example method in which the processor 204 instructs the first communication module 208 to change the status of the appliance based on the output of the sensor 210 is described in relation to FIG. 6. Specifically FIG. 6 discusses an embodiment wherein the sensor 210 is a temperature sensor. An example method in which the processor 204 instructs the first communication module 208 to change the status of the appliance based on a received signal at the second communication module 209 is described in relation to FIG. 4C.

The second communication module 209 is configured to receive a user signal from a first user device. The second communication module 209 is configured to communicate with a user device via a second communication link that is different from the first communication link. In an embodiment the second communication module 209 is configured to transmit and receive signals using a WiFi signal (i.e. a protocol from the IEEE 802.11 family of protocols). Alternatively the second communication module 209 is configured to transmit and receive signals using the Zigbee protocol (i.e. an IEEE 802.15.4 based protocol).

Although in the above example the second communication module 209 is configured to communicate with a user device, it is emphasised that the second communication module 209 could additionally or alternatively be used to communicate with other devices including a smart meter.

The device 106 may also comprise a temperature sensor 210. The temperature sensor 210 is configured to measure the temperature of the device 106. For example, the temperature sensor 210 senses the ambient air temperature within an enclosure comprising the device 106. The temperature sensor 210 may be a thermistor for example. The temperature sensor 210 is communicatively coupled to the processor 204. In this way the processor 204 is able to monitor the temperature of the device 106.

In another embodiment the temperature sensor 210 is replaced with a different type of sensor, for example a humidity sensor. In another embodiment the temperature sensor 210 is replaced with a fire or flame sensor. The fire or flame sensor may be a graphene based multifunctional flame sensor where a change in the electrical conductivity of the graphene is used to sense the presence of a flame. Optionally the graphene based fire sensor comprises a combination of a vertically arranged sensor and a horizontally arranged sensor.

In yet another embodiment the temperature sensor 210 is replaced by a sensor comprising one of more of: a temperature sensor, a humidity sensor and another type of sensor.

The device 106 may also comprise an output means 211. The output means 211 is connected to the processor 204. The processor 204 is configured to cause the output means 211 to emit an alert whenever a reading from the temperature sensor 210 exceeds a predetermined threshold. The output means 211 is a buzzer and the alert is an audible alert. Optionally, the output means 211 could be a light source and the alert is a visual alert. In an embodiment, the temperature threshold is between 70° C. and 90° C. In this manner, a fire in the electrical appliance 101 may be detected, since a fire in the electrical appliance 101 will likely cause an increase in the temperature at the device 106. The temperature may be continuously monitored, for example a reading may be taken once per second, or 100 times per second. Where a flame or fire sensor is included, the output means is caused to emit an alert whenever a flame or fire is detected.

Further data may be generated at the processor 204, including one or more of: live power consumption, an average power consumption, a cumulative power consumption over a predetermined period of time, an energy cost for a predetermined period of time, a device type, a device status and temperature may be transmitted by the second communication module 209. For example, data may be transmitted to the user device or to the cloud.

The device 106 may also comprise a display 212. The display 212 is connected to the processor 204 and is configured to display information including, but not limited to: a live power consumption, an average power consumption, a cumulative power consumption over a predetermined period of time, an energy cost for a predetermined period of time, a device type, a device status and a local temperature. The display 212 may show one or more of: a live current consumption, an average current consumption, a cumulative current consumption over a predetermined period of time, an energy cost for a predetermined period of time, a device type, a device status and a local temperature. The display 212 may also be configured to display prompts to a user, said prompts requesting that the user control an electrical appliance using the remote control in a certain manner.

The device 106 may be contained within a protective enclosure or housing 213.

Figure 3A:
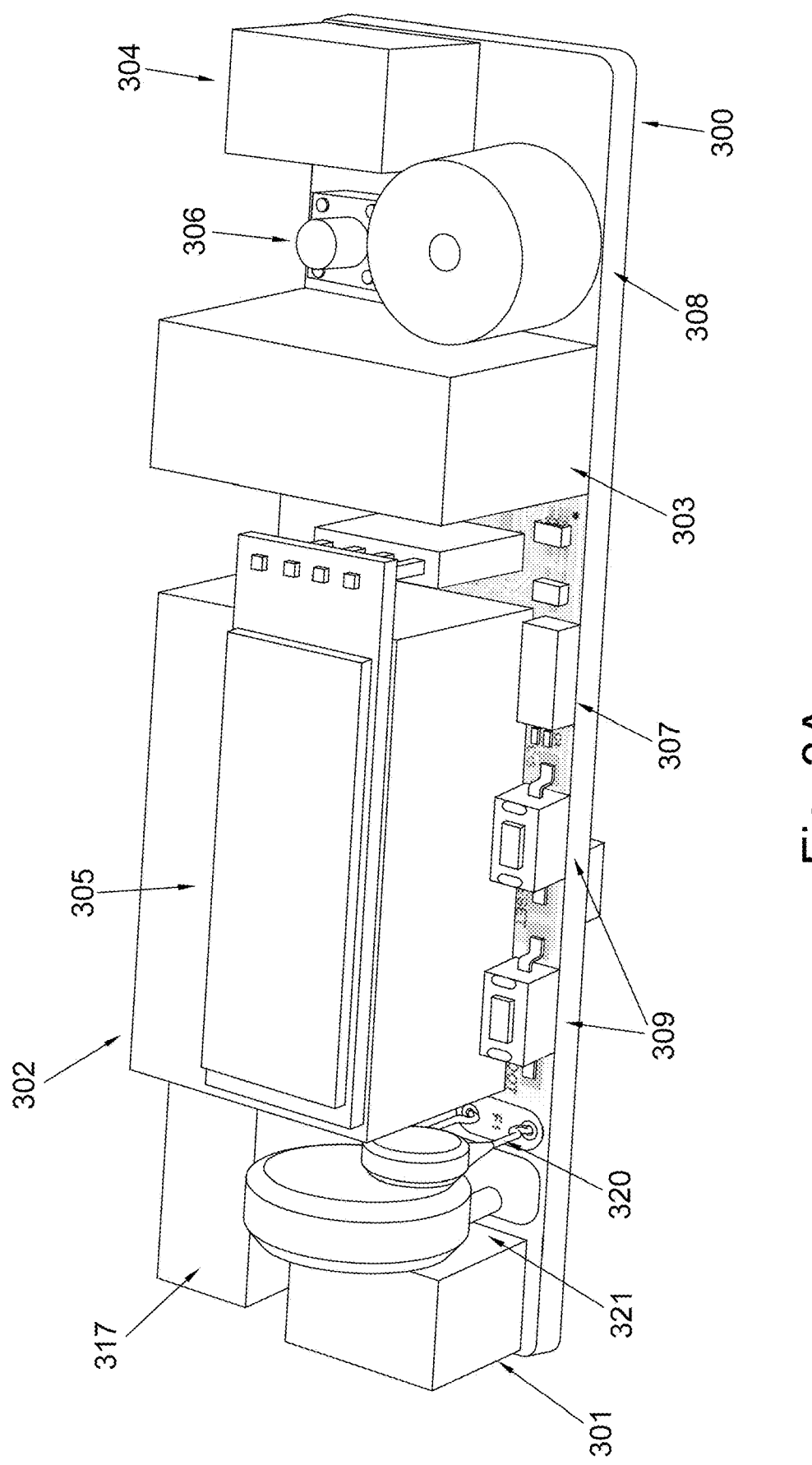
FIG. 3A shows a first side of a fabricated device according to an embodiment.
Figure 3B:
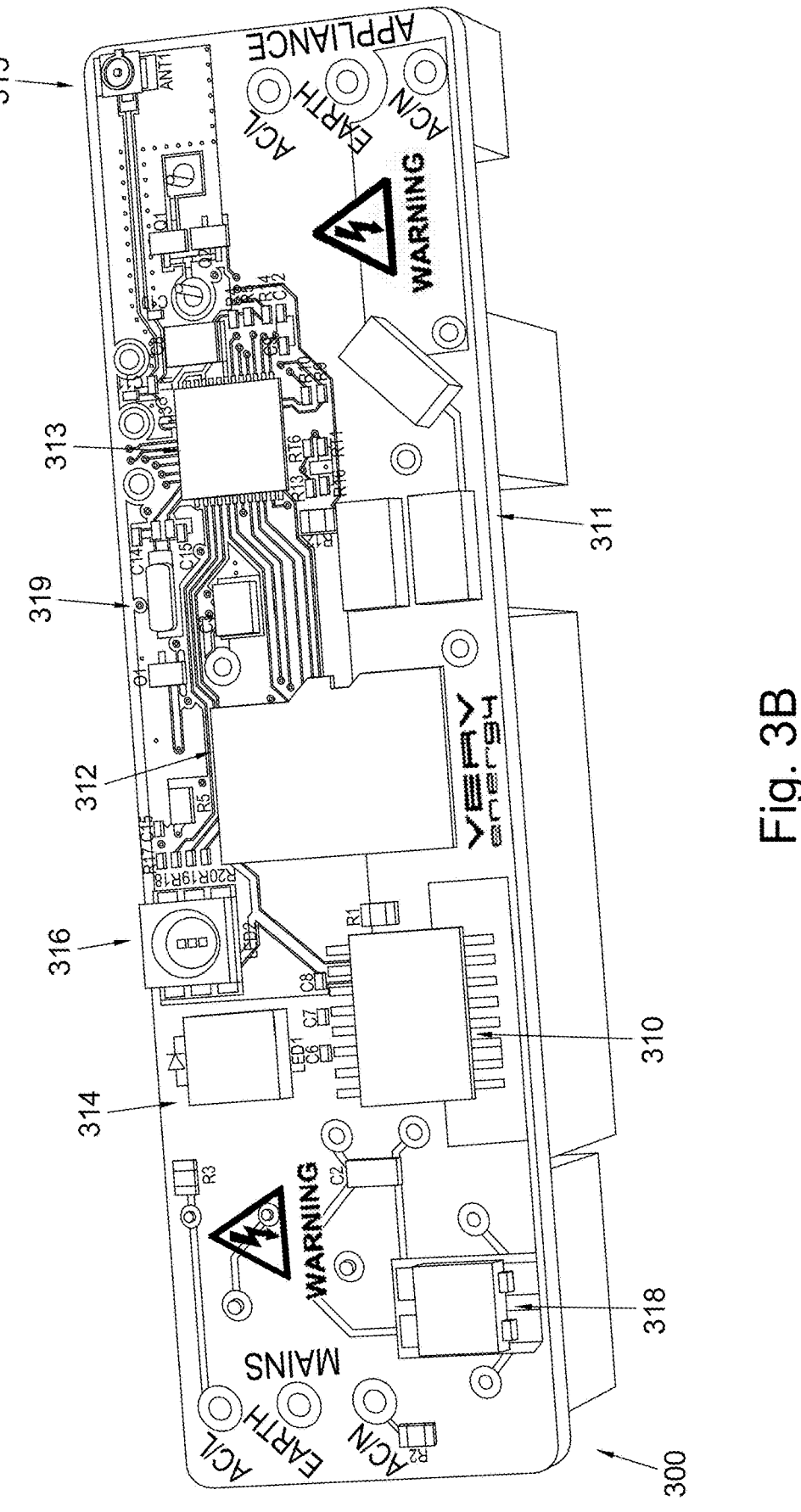
FIG. 3B shows a second side of the fabricated device according to an embodiment.

FIG. 3A shows a schematic illustration of a first side of a fabricated device according to an embodiment. FIG. 3A shows a first side of a printed circuit board 300. The first side of the printed circuit board 300 comprises an input connector 301 which is connected to a power cable and an output connector 304 connected to a power cable. A relay 303 is connected between the input connector 301 and the output connector 304. A microprocessor 313 is located on the underside of the printed circuit board 300, which is shown in FIG. 3B. The microprocessor 313 comprises an ADC for converting voltage and current measurements.

FIG. 3A also shows a power supply 302 which is connected to the input connector 301. The power supply 302 is configured to convert the input voltage into a supply voltage which is suitable for use by various components including, but not limited to, the microprocessor 313, a temperature sensor 307, an audio output means 308, a display 305, a memory 312 and an Infra-Red emitter and receiver 314. The memory 312 may be a card-on-pcb technology for greater reliability.

The first side of the printed circuit board 300 comprises a temperature sensor 307 which is connected to the microprocessor 313 and is configured to sense the temperature of the device. The first side of the printed circuit board 300 also comprises an audio output means 308 which is configured to output an audible alert in response to receiving a control signal from the microprocessor 313.

The temperature sensor 307 is a temperature sensor for early fire detection, and the audio output means 308 is an audio indicator.

The first side of the printed circuit board 300 also comprises a user button 306 and a display 305, both of which are separately connected to the microprocessor 313. The display may be an OLED display, for displaying real-time and historical data. The user button 306 is configured to control the output of the display 305 to select between displaying of the various options described above for example. Optionally the display 305 is an OLED display for real-time and historical data.

Further user buttons 309 may be configured to control programming a remote control functionality into the device. Details of how the remote control functionality is programmed will be discussed in more detail later in the description however, in essence, this functionality enables the device to replicate the signals transmitted by a remote control of the electrical appliance.

The first side of the printed circuit board 300 also comprises a set of buttons 309 for programming the firmware of the processor 313.

The first side of the board 300 further comprises a safety capacitor 317. The first side of the board 300 may further comprise a fuse 320. The first side of the board 300 may further comprise a varistor 321, for protection of the power supply.

The second side comprises an infra-red emitter and receiver 314 which is coupled via the printed circuit board to the microprocessor 313. The infra-red emitter and receiver 314 forms the first communication module 208 and is configured to remotely communicate with the electrical appliance 101. Optionally, the infra-red emitter and receiver 312 is a learning IR receiver and external IR emitter.

The second side of the printed circuit board 300 also comprise a WiFi antenna port 315 which is connected to the microprocessor 313, the WiFi antenna port forming part of the second communication module 209. This port connects to an external patch antenna for extended WiFi range.

The microprocessor 313 is also connected to a memory 312, a current sensor 310 and a voltage sensor 311. The current sensor 310 and the voltage sensor 311 are configured to measure a current and a voltage between the input connector 301 and the output connector 304. The voltage sensor 311 comprises three large resistors for measuring line voltage. SA filter 318 may be included to remove noise. Optionally, the device also comprises a plurality of visual indicators 316 which are connected to the microprocessor 313. These may be used to indicate device status for example (e.g. on or off). They may provide full-colour RGB.

A real time clock 319 comprising a crystal may further be included.

FIG. 3A and FIG. 3B show how the second side of the printed circuit board 300 comprises low-profile components while the first side of the printed circuit board 300 comprises components with larger dimensions (i.e. larger heights from the printed circuit board 300). Arranging the plurality of components in this way achieves a reduction in overall device size. In an embodiment, the board is 90×24 mm and about 24 mm thick, including the components.

FIG. 4A shows a method of controlling an electrical appliance which may be implemented by an in-line device according to an embodiment. Although the following methods are described with reference to the device 106 discussed above, it is emphasized that other devices could implement the following methods.

FIG. 4A begins in step 401 by the processor 204 receiving a user signal via the second communication module 209, this signal specifying an operation of the electrical appliance 101. For example, where the electrical appliance is an air conditioning unit a first operation may be to increase the temperature, a second operation may be to decrease the temperature, a third operation may be to increase the fan speed and a fourth operation may be to decrease the fan speed.

In step 402 the processor 204 identifies a stored control signal that is associated with the operation of the electrical appliance 101. For example, the user signal may comprise instructions to carry out a first operation (e.g. to increase the temperature). A look up table storing information specifying a control signal corresponding to the first operation is then consulted.

The control signal may be stored in the memory 205 of the device 106 and retrieved in step 402. A plurality of control signals may be stored in the memory 205, together with their associated operation at the time of manufacture. Additionally or alternatively, the plurality of signals stored in the memory 205 could also be generated as part of a programming method which will be discussed in more detail later. Alternatively, the control signal may be stored in the cloud and retrieved via an Internet connection, for example by being downloaded from the cloud. Alternatively, the control signal may be specified as part of the user signal.

In step 403 the method transmits the control signal which was identified in step 402 via the first communication module 208 to the electrical appliance 101.

As described above, the first communication module may communicate with the electrical appliance 101 using an infra-red communication link and the second communication module communicates with a user device 105 via a WiFi link, for example using a variety of internet based protocols.

In this way the method carried out by the in-line device is able to replicate at least some of the functionality present in an electrical appliance's remote control while also permitting control of the appliance by a non-proximate user device.

As an example, in step 401 the device receives a user signal from a user device via the second communication module to decrease the output temperature of the air conditioning unit. The processor 204 subsequently identifies information characterising an infra-red control signal stored in the memory which decreases the output temperature. This information may be the frequency and duration of the infra-red pulses of the control signal for example, enabling the reproduction of a control signal which, if transmitted by the remote control of the air conditioning unit, would cause a decrease in the output temperature of the air conditioning unit. After identifying the control signal, the processor 204 transmits the control signal via the first communication module 208 to the appliance.

Although Infra-red control signals have been described, the control signal could alternatively be specified by digital samples of a radio frequency waveform.

FIG. 4B shows a further method of controlling operation of an electrical appliance which may be implemented by an in-line device in accordance with an embodiment. In step 411 the method begins by receiving a user signal via the second communication module 209 specifying a state of the electrical appliance 101. As an example, the specified state could be either "on" or "off".

In step 412 the method, implemented by the processor 204, controls the state of the electrical appliance according to the state specified in the received user signal. In the device of FIG. 2 the processor 204 generates a control signal which configures the relay 202 to be in a certain configuration (e.g. a first configuration where the power supply is connected to the electrical appliance or a second configuration where the power supply is disconnected from the electrical appliance) depending on the contents of the received user signal.

Both the methods of FIG. 4A and FIG. 4B may be performed by the device. For example, if the user signal specifies switching the appliance on or off, the method of FIG. 4B is performed. If the user signal specifies controlling a further operation of the appliance, the method of FIG. 4A is performed.

FIG. 4C shows additional steps which may be performed in a method of controlling an electrical appliance which may be implemented by an in-line device in accordance with an embodiment. In the method, the processor 204 obtains data from voltage sensor and current sensor measurements and instructs the communication module 209 to transmit the data. The processor then instructs a change in the status of the electrical appliance, via the first communication module or the relay as described above, based on a received signal.

The processor 204 may perform processing of the data measured at the current sensor, to generate one or more of: a live current consumption, an average current consumption, and a cumulative current consumption over a predetermined period of time. The processor 204 may perform further processing of the data measured at the current sensor and voltage sensor to generate one or more of: a live power consumption, an average power consumption, a cumulative power consumption over a predetermined period of time, an energy cost for a predetermined period of time, a device type, and a device status.

In one example the device type is determined by the processor 204 communicating data measured by the current and/or voltage sensor to the cloud where an automatic pattern matching service determines the device type, make and model.

The processor 204 may continuously generate power consumption data, or may generate power consumption data in response to a specific request for example.

The power consumption data may be one or more of a real power, apparent power or RMS power signal calculated at the processor from the current and voltage data, and may be calculated using windows corresponding to 1 or more mains cycles for example.

In an embodiment, the RMS power and a power factor (the shift in phase of the current signal when compared to the voltage signal) values are calculated over a number of mains cycles, to improve the signal to noise ratio.

A real power value $P_l$ for a window I may be calculated at the processor using the expression:

$$P_l = \frac{1}{N}\sum_{n=1}^{N} v_n(t)i_n(t), \quad t \in T_l$$

where N is the number of samples in each window I and $v_n(t)$ and $i_n(t)$ are the current and voltage values for the sample n of the voltage and current signals, with or without background removed. For a 10 kHz read frequency in a country with 50 Hz main power, where the window corresponds to 1 mains cycle, N=200.

An apparent power value $|S|_l$ for a window I may be calculated at the processor from:

$$|S|_l = \frac{1}{N}\sqrt{\sum_{n=1}^{N} v_n(t)^2}\sqrt{\sum_{n=1}^{N} i_n(t)^2}, \quad t \in T_l$$

One or more of the real power, apparent power and RMS power are all calculated and may be used as live power consumption data. Real power corresponds to the apparent power multiplied by the power factor (the shift in phase of the current signal when compared to the voltage signal).

An energy cost may be determined from the power consumption data and data obtained via an Internet connection relating to current energy pricing.

In step 421 the method receives a request for data relating to power consumption. This request is received via the second communication module 209 or inputted by the user selecting an option on the display 305 using the user button 306 for example. Although in this example, the processor instructs transmission of data in response to a request, alternatively, data is continuously transmitted, or transmitted in response to detection of a feature in the power data for example.

After receiving a request for data relating to power consumption, the method proceeds to step 422 where the data is obtained and communicated to a user. The data may comprise one or more of a live current consumption, an average current consumption, and a cumulative current consumption over a predetermined period of time, a live power consumption, an average power consumption, a cumulative power consumption over a predetermined period of time, an energy cost for a predetermined period of time, a device type, and a device status. The power consumption may be a real power, power factor, apparent power or RMS power signal calculated at the processor from the current and voltage data, and may be calculated using windows corresponding to 1 or more mains cycles for example. The method by which the data is communicated to the user may depend on the method by which the request was received. For example, if the request for data is received via the second communication module then the power consumption information may be communicated to the user device via the second communication module. Likewise if the request for power consumption information is received by the selection of a display option using the user button 306, then the power consumption may be communicated to the user via the display 305.

While step 422 of FIG. 4C shows the method of providing power consumption in response to a request for power consumption information it is emphasized that monitoring of power consumption information may be continuous such that readings of the voltage sensor and the current sensor occur automatically, at a predetermined rate, without any input from a user, and these measurements are used by the processor to continuously generate power consumption data. Transmission may be performed continuously, or in response to detection of some feature in the data.

In the device 106, power consumption information is generated by obtaining readings from the voltage sensor and the current sensor. Readings from the voltage sensor and/or the current sensor are stored in the memory for analysis at a later time. In addition to power consumption information it is anticipated that the readings from the voltage and the current sensors could be used to determine a range of values including, but not limited to, a live power consumption, an average power consumption, a cumulative power consumption over a predetermined period of time, an energy cost for a predetermined period of time, a live current consumption, an average current consumption, a cumulative current consumption over a predetermined period of time and a live output voltage of the device.

Figure 5:
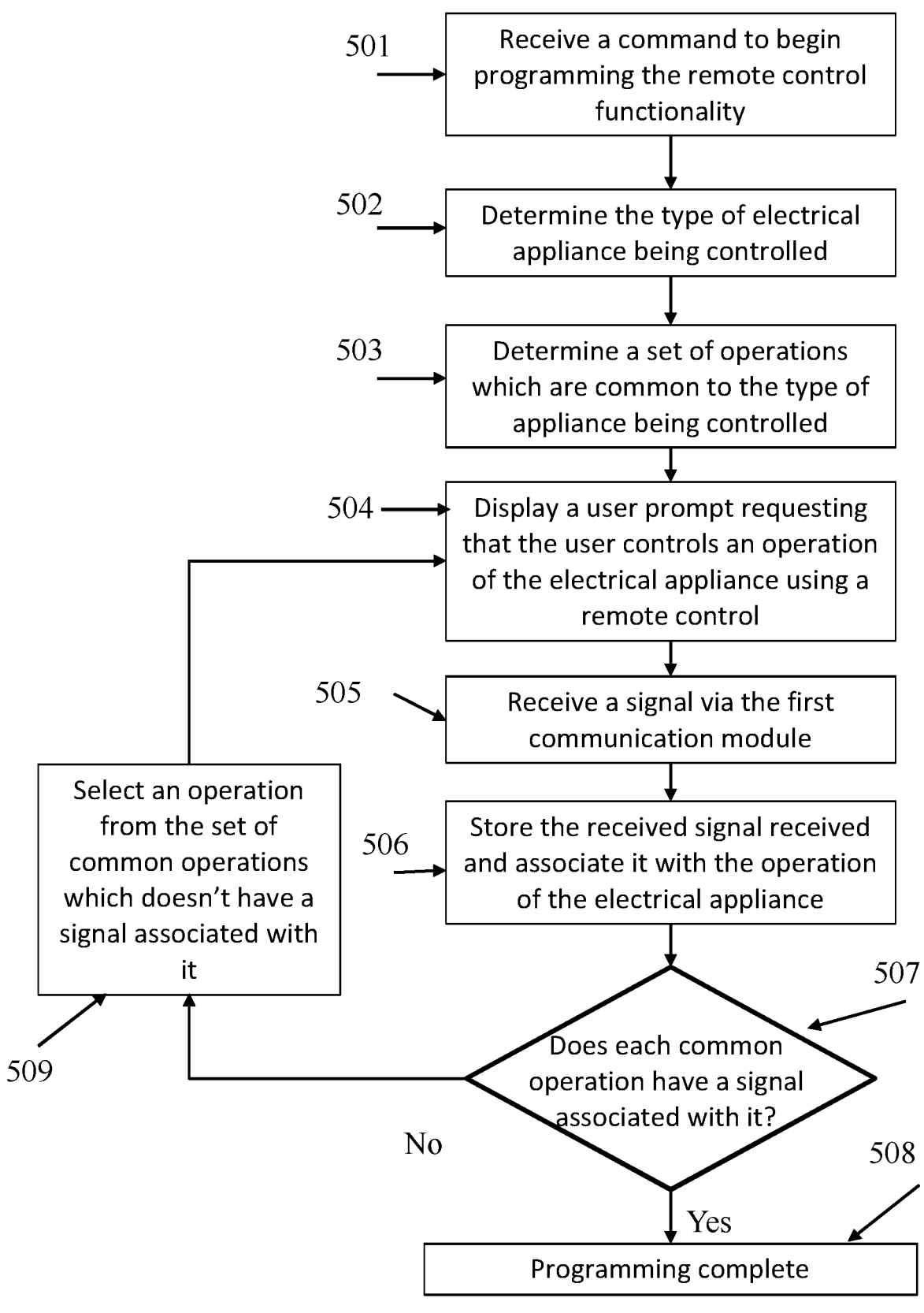
FIG. 5 shows a method of programming remote control functionality which may be performed by a device according to an embodiment.

FIG. 5 shows a method of programming remote control functionality to a device. This method may be performed during an initial "set up" phase of the device. The method begins in step 501 by receiving a command to begin programming remote control functionality to a device. The command to begin programming may be generated by selecting an option on the display 305 using the user button 306. Additionally or alternatively the command to begin programming may be generated in a response to a message received via the second communications module.

In step 502 the method determines the type of electrical appliance being controlled. For example it may determine that the electrical appliance being controlled is a Heating, Ventilation and Air Conditioning (HVAC) unit. In this step a specific type of electrical appliance is associated with a broader category of electrical appliance that comprises many manufacturers and models. For example, a range of different television models from different manufacturers may be associated with the electrical appliance type "television".

In an embodiment the type of appliance being controlled is specified by a user via the display 305 and the user button 306. In an alternative embodiment, the type of electrical appliance being controlled is specified by the manufacturer and stored in the memory 312. In an alternative embodiment the type of electrical appliance being controlled is specified in a signal which is received via the second communications module. In an alternative embodiment the type of electrical appliance is determined using the method described in relation to FIG. 12.

In step 503 the method determines a set of operations which are commonly associated with a remote control of the type of electrical appliance being controlled. For example, a HVAC unit will generally facilitate the following operations; increasing an output temperature of the HVAC unit and decreasing an output temperature of the HVAC. Likewise where the electrical appliance type is a television, the common operations could be; increasing the output volume and decreasing the output volume.

Determining the common operations may involve using a lookup table stored in the memory 312, the lookup table associating an electrical appliance type with a predetermined set of common functionalities. Alternatively, the set of common operations is contained within a signal received via the second communications module.

In step 504 the method displays a user prompt on the display 305 requesting that the user controls a functionality of the electrical appliance from the set of common operations which was determined in step 503. For example, in the case of a HVAC electrical appliance the display may show "Increase output temperature". This command prompts a user to press a button on the electrical appliance's remote control which increases the output temperature of the HVAC appliance.

Alternatively the user prompt is communicated to the user device via the second communications module and subsequently displayed on the device associated with the user (e.g. a mobile phone).

In step 505 the method receives a control signal via the first communications module. This signal corresponds to the signal generated by a user in response to the prompt of step 504. The processor obtains information specifying the signal. For example, where the first communications module is an infra-red emitter and receiver the processor obtains the duration and the frequency of the infra-red light pulses from the received control signal.

In step 506, information specifying the control signal received via the first communications module is stored in a memory and is associated with the operation displayed to the user in step 504. In the example discussed above, the device stores information specifying a signal which, when outputted by the device, will replicate the signal produced by a remote control of the electrical appliance, thereby facilitating remote control of the electrical appliance by the device 106.

In step 507 a determination is made as to whether each operation from the set of common operations has a stored signal associated with it. If each common operation does have a stored signal associated with it then the programming of the device is complete as shown in step 508. Once the programming of the device is complete the electrical appliance can be controlled by a user device 106 via the second communication module in accordance with the method of FIG. 4A.

If each operation from the set of common functionalities does not have a stored signal associated with it then the method selects an operation from the set of common operations which doesn't have a signal associated with it as shown in step 509. The method subsequently loops back to step 504 where the newly selected operation is prompted to the user.

In an embodiment the method is configured to generate prompts for operations in a predetermined order.

Figure 6:
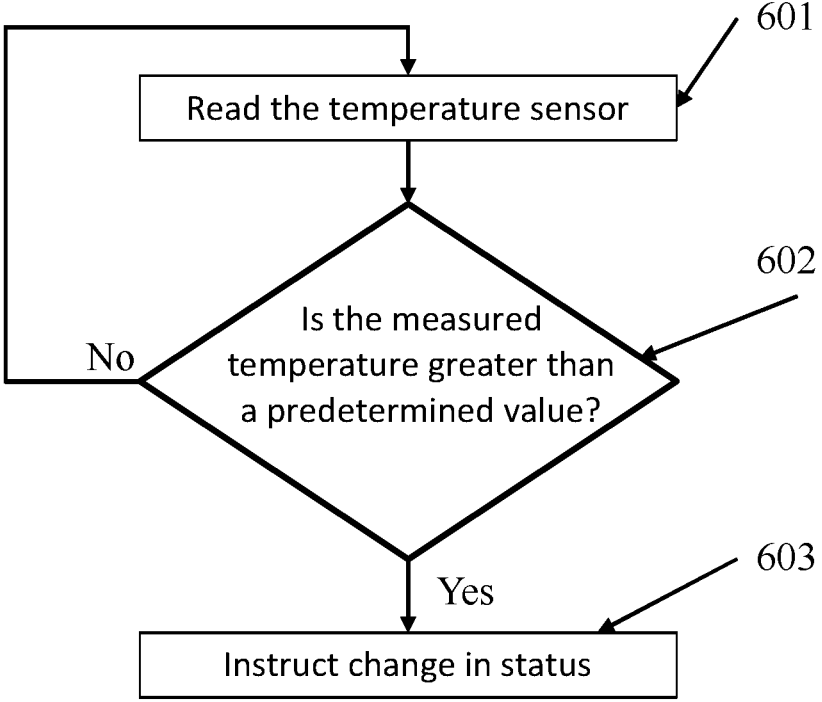
FIG. 6 shows a method of monitoring temperature which may be performed by a device according to an embodiment.

FIG. 6 shows a method of monitoring the temperature of the device which may be implemented by an in-line device according to an embodiment. As discussed above, the device 106 may optionally comprise a temperature sensor 210. It is possible to monitor the temperature of the device and use this information to detect a fire in the appliance.

The method begins in step 601 by reading the temperature sensor. In FIG. 3A the temperature sensor is shown with reference numeral 307 and is read by the processor 313. The temperature sensor may comprise a thermistor. The readings may be taken continuously, for example once per second, or one hundred times per second.

In step 602 the processor determines whether the temperature, which is read in step 601, is greater than a predetermined threshold. In an embodiment the threshold is between 70 degrees Celsius and 90 degrees Celsius. This threshold may be set by the manufacturer or alternatively it could be decoded from a signal received via the second communications module. The threshold may be stored in the device memory for example.

If the temperature is greater than the predetermined value then the method proceeds to step 603, where a change in status of the electrical appliance is instructed. The processor then instructs a change in the status of the electrical appliance, via the first communication module or the relay as has been described above, based on the detection of the temperature increase. Since the device is located within a proximity of the electrical appliance it is possible to infer the presence of a fire in the electrical appliance when the temperature is above the predetermined value, and consequently shut off the device if a fire is detected.

For example, the processor is configured to control the switch to stop the power supply when the temperature threshold is exceeded. In this manner, the processor automatically turns off the electrical appliance when the temperature threshold is exceeded. A message may also be sent to the user device 105 indicating that the power supply has been stopped and why.

Optionally, the output means is also activated. In the device of FIGS. 3A and 3B this step is implemented by the processor 313 sending a control signal to the audio output means 308. In an embodiment an alert is also transmitted via the second communication module 604.

If the reading obtained from the temperature sensor is not greater than the predetermined value in step 602 then the method loops back to step 601 and continues to monitor the temperature. The temperature sensor may be continually monitored, monitored at a predetermined interval, or the monitoring may be triggered by a signal received via the second communications module for example.

Although the above description relates to the use of a temperature sensor, alternatively a flame or fire sensor could be used, as has been described previously.

Figure 7:
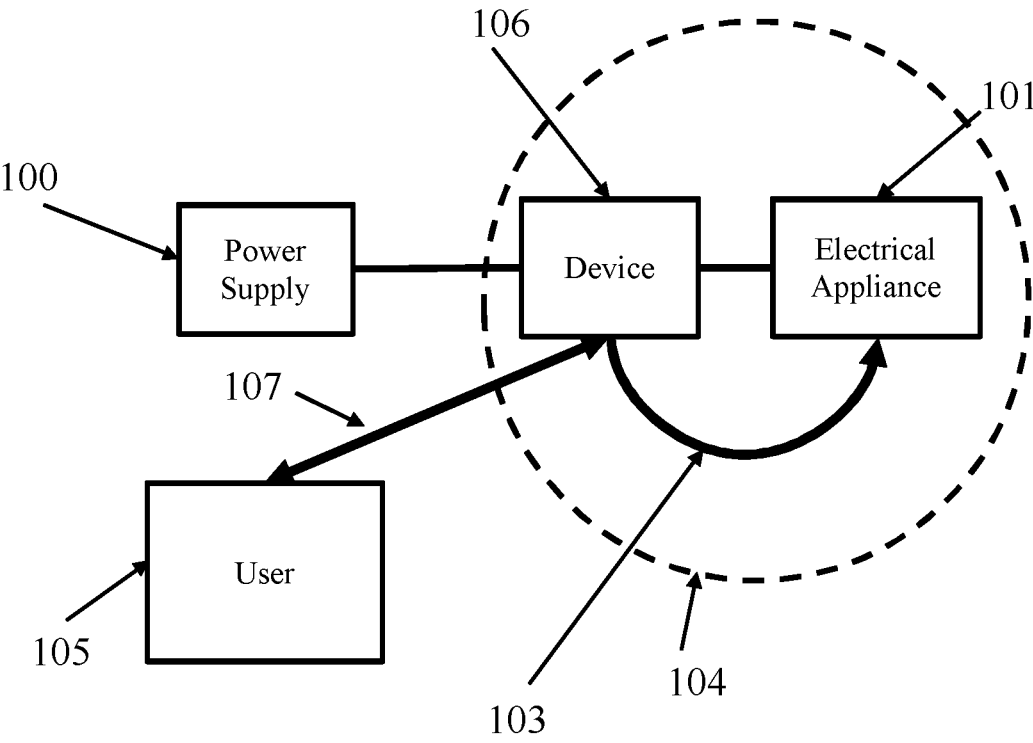
FIG. 7 shows an exemplary system comprising a device according to an embodiment.

FIG. 7 shows a system comprising a device in accordance with an embodiment. FIG. 7 shows a device 106 connected in-line between a power supply 100 and an electrical appliance 101. The device 106 has been programmed in accordance with the learning algorithm of FIG. 5 and is configured to communicate with the electrical appliance 101 via a first communications module which uses a first communication link 103. Since the device is positioned within an area 104 it is able to remotely control the electrical appliance 101. The device is also communicatively coupled to a user device 105 via a second communication link 107. The user device 105 is located outside the area 104 in which a user would ordinarily be able to control the electrical appliance 101. As such the device 106 facilitates remote control of the electrical appliance 101 and control of the supply of power to the electrical appliance 101. The device 106 enables a legacy electrical appliance to be controlled remotely using a single standardised technology for example.

As discussed above the device may also provide additional functionality to the user including monitoring of the voltage, current and/or power consumption and/or monitoring a temperature of the device 106.

Although the remote control of the electrical appliance 101 is not shown in FIG. 7 it is emphasized that the electrical appliance could still be controlled using the remote control shown in FIGS. 1A and 1B.

Figure 8:
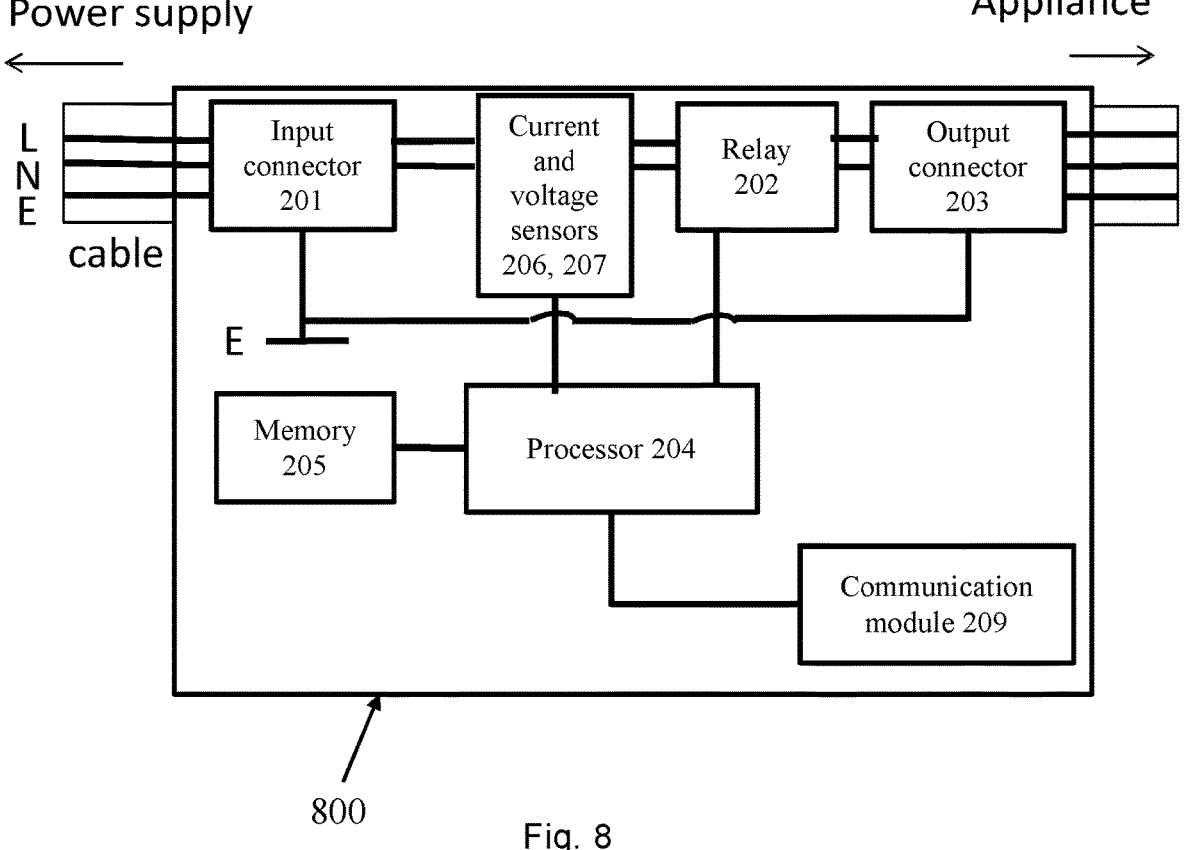
FIG. 8 shows a device for responding to a demand side response signal according to an embodiment.

FIG. 8 shows a device for responding to a demand side response signal according to an embodiment. FIG. 8 shows a device 800 comprising an input connect 201, current and voltage sensors 206 and 207, a relay 202, an output connector 203, a processor 204, a memory 205 and a communication module 209. The same reference numerals as FIG. 2 are used to denote similar components and therefore description of the corresponding components will be omitted.

Demand side response refers to a scheme whereby a consumer of electricity is incentivised (financially or otherwise) to lower or shift their energy consumption at peak times, or more generally at any time when the demand for electricity is greater than the supply. By considering demand side response signals the electricity usage pattern of a consumer can be adapted to avoid blackouts or strains on the electricity grid.

Exemplary electrical appliances for demand side response action include thermostatically controlled systems such as refrigerators, air-conditioning units and water heaters (e.g. immersion heaters). Furthermore some washing machines and dryers have the ability to resume an incomplete cycle after being switched off and on again, thereby enabling demand side response action.

More generally, any electrical appliance where the disconnection of, or any the variation to, the power supply won't affect the long-term operation of the electrical appliance is appropriate for demand side response action. In light of this, the device 800 may be connected in-line along a cable configured to connect the power supply to any electrical appliance to which this applies.

A demand side response action may be triggered by an explicit request from the utility company or the grid operator to reduce the demand on the electricity grid. This signal, also known as a demand response signal, is received by the communication module 209.

In another example the device 800 is configured to generate a demand response signal after detecting a sign of grid stress, or in other words a sign that the demand for electricity is outstripping the supply of electricity.

One sign of grid stress is a drop in the frequency of the power supply. In the embodiment of FIG. 8 the frequency of the power supply is determined based on the measurements from the current and voltage sensors 206, 207. If the frequency of the power supply drops below a predetermined threshold a demand response signal is generated. Optionally a demand response signal is generated if the moving average for the supply frequency falls below a predetermined value. In another example the predetermined value is calculated based on a percentage drop from the nominal operating frequency. For example the predetermined value may be 49.85 Hz (i.e. 0.3% below 50 Hz).

In one example the frequency of the power supply is determined by the processor 204 based on measurements from the current and voltage sensors 206, 207. In a different example the frequency of the power supply is determined in the cloud based on measurements from the current and voltage sensors 206, 207.

Optionally, only one of the current sensor 206 or the voltage sensor 207 is used to determine the input frequency of the power supply.

The device 800 is configured to change a status of the electrical appliance upon receipt of the demand response signal. A status of the electrical appliance includes the power supply status (e.g. on or off) as well as the current operating status of appliance. For example, in the case of an air conditioning unit a status of the electrical appliance may include a fan speed or a temperature.

The processor 204 controls the operation of the electrical appliance upon receipt of a demand response signal using the control module which is configured to control a status of the electrical appliance as described previously. For example, in response to receiving a demand response signal, the processor 204 is configured to instruct the relay 202 to disconnect the power supply to the electrical appliance. Alternatively, the processor may instruct a further communication module (not shown) to transmit a control signal to the electrical appliance, where the control signal controls the operation of the electrical appliance, as has been described previously.

Optionally the processor 204 is also configured to subsequently instruct resuming of normal operation once a condition has been met.

For example, the condition could be that a predetermined duration of time has expired since the demand response signal was received. The predetermined duration of time could be one of: a duration specified in the demand response signal received via the communication module 209, or a maximum off-time, for example 15 minutes. The maximum off-time may be a predetermined duration of time set by a user, a predetermined duration of time set according to the type of the electrical appliance or a default duration of time. Where the demand response signal is generated from measurements of the power supply input frequency, the condition (which causes the power supply to be reconnected to the appliance) could be that the sign of stress in the electricity grid is no longer present (e.g. the frequency of the power supply has recovered to 50 Hz).

In another embodiment the condition for instructing the control module to resume normal operation is met when a maximum amount of demand response, over a predetermined period of time, has been exceeded. For example, the maximum amount of demand response is 1 hour and the predetermined period of time is 12 hours. In this example, the processor will instruct the control module to resume normal operation of the electrical appliance if it has been suspended for more than 1 hour in the previous 12 hours.

Optionally, the maximum amount of demand response and the predetermined period of time could be: set by a user, determined based on the type of the electrical appliance connected to the in-line device or a default value.

As discussed above, a consumer of electricity may be rewarded financially for responding to a demand response signal. As such it is desirable to know the amount of energy consumption that is shifted from a peak period to an off-peak period as a result of responding to the demand response signal.

In one example the amount of energy shifted by responding to a demand response signal is determined by measuring the energy consumption of the electrical appliance for a predetermined period of time after normal operation of the electrical appliance has resumed, this predetermined period of time equalling the period of time which the operation of the electrical appliance was suspended for. For example, if following a demand response signal the processor instructs the control unit to disconnect the power supply to the electrical appliance for 15 minutes then, upon resuming normal operation the processor 204 will measure the energy consumption, using the voltage and current sensors 206 and 207, for a period of 15 minutes.

This approach is used when responding to the demand response signal effectively pauses the operation of the electrical appliance for example. For example, when the electrical appliance is a washing machine or a dryer, the electrical appliance's energy consumption is equal to the shifted energy consumption since the appliance's energy consumption in the predetermined time after resuming normal operation is identical (or near identical) to the appliance's energy consumption over the same period of time had it not responded to the demand response signal.

In another example, the energy consumption of the electrical appliance for the predetermined period of time after normal operation of the electrical appliance has resumed equals an upper bound of the shifted energy consumption. This measure could be used for an air conditioning unit, since by responding to the demand response signal the electrical appliance (i.e. the air conditioning unit) may have to work harder and consume more power in order to meet a specific result. For example, the air conditioning unit may have to work harder and consume more power in order to return a room to a predetermined ambient air temperature since it has been turned off for a period of time.

Figure 9:
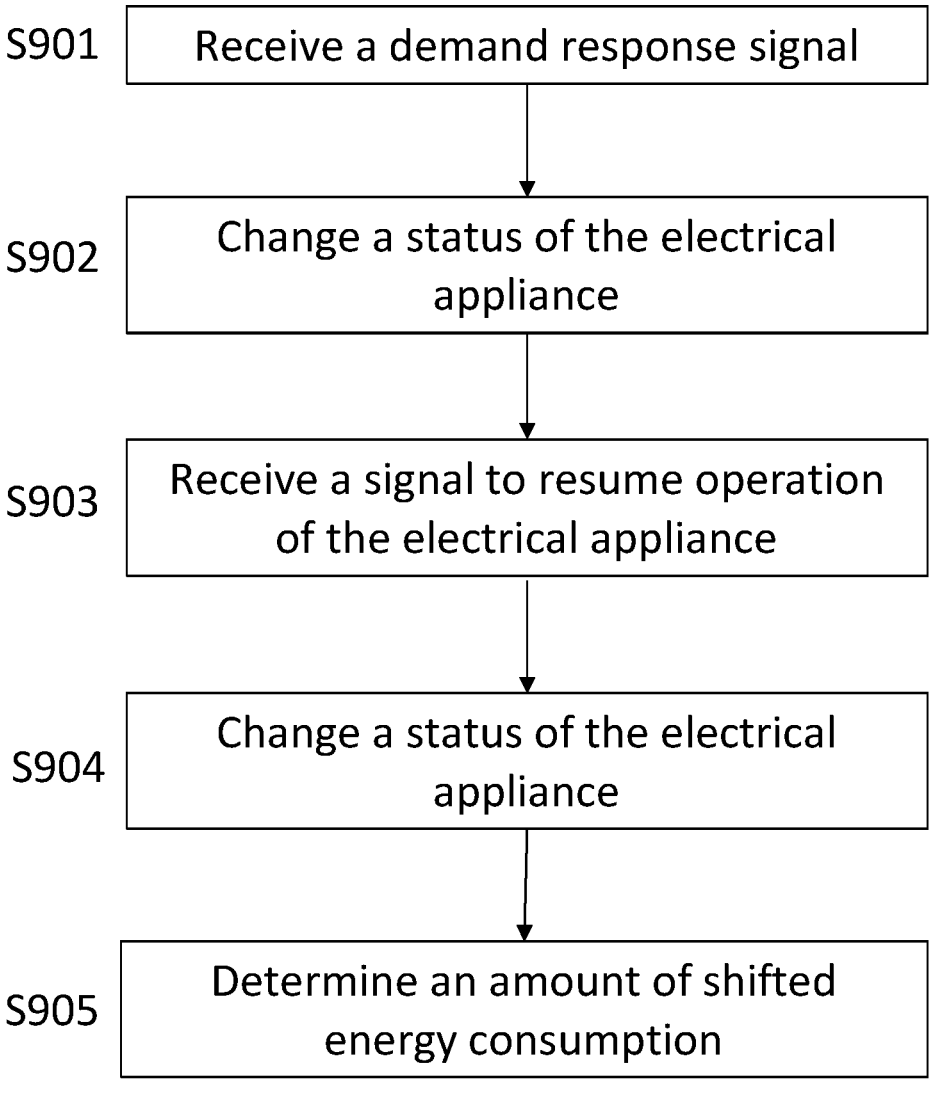
FIG. 9 shows a method of responding to a demand side response according to an embodiment.

FIG. 9 shows a method of performing demand side response according to an embodiment. FIG. 9 begins in S901 by the processor 204 receiving a demand response signal. As discussed above the demand response signal could be transmitted by a utilities supplier and received via the communication module 209 of the in-line device 800. Alternatively, the demand response signal could be generated by observing the frequency of the power supply and identifying when the frequency drops below a threshold.

In step S902 the processor 204 changes a status of the electrical appliance, by instructing the control module. Where the control module comprises the relay 202, step 902 may comprise configuring the relay to disconnect the power supply to the electrical appliance.

After responding to the demand response signal in step S902 a number of optional further steps could be completed.

In step S903 the processor 204 receives a signal to resume the operation of the electrical appliance. As discussed above the signal could be received via the communication module 209, optionally from a utilities provider. Alternatively the signal to resume the operation of the electrical appliance could be generated once a time period, indicated in the demand response signal, has elapsed.

After receiving a signal to resume operation of the electrical appliance, the processor 204 changes a status of an electrical appliance using the control module. Where the control module comprises the relay 202, step S904 may comprise configuring the relay to connect the power supply to the appliance.

In step S905 the processor 204 determines an amount of energy consumption which was shifted by responding to the demand response signal.

Figure 10:
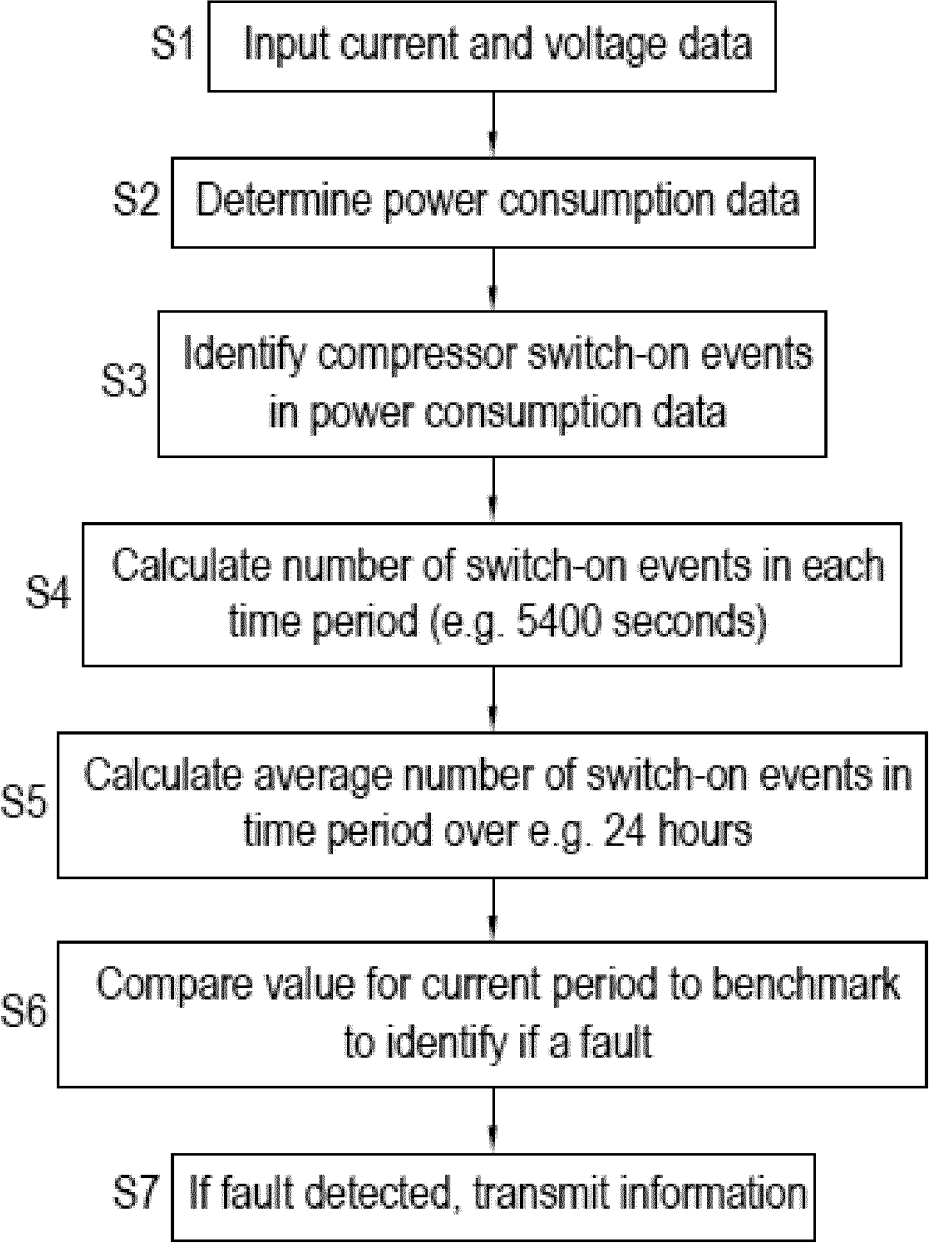
FIG. 10 shows a method of condition monitoring an appliance according to an embodiment.

FIG. 10 shows a method implemented by an in-line device according to an embodiment in which the processor 204 obtains data from the voltage sensor and the current sensor 206 and 207 and monitors the data for a first feature.

As previously discussed, the in-line device is able to read voltage and current at high frequency to store, analyse and communicate the performance of the appliance. Optionally, the in-line device is able to infer the performance of the appliance over time in order to determine whether the appliance is operating efficiently. By way of example only, the in-line device is configured to analyse and store the performance of the appliance connected to the output connector 203 and compare its current performance to historical data, located within the in-line device or remotely stored on a network or an external servers. This may be referred to as condition monitoring.

Using the techniques discussed above the in-line device is configured to generate power consumption data comprising one or more of a real power, an apparent power or a RMS power signal calculated at the processor 204 based on the current and voltage data.

The performance of the electrical appliance connected to the output connector 203 of the in-line device may be monitored by repeatedly generating a set of one or more features using the power consumption data and comparing each generated feature set to comparison data at the processor 204.

The feature set may comprise information relating to a switch-on frequency of one or more components of the electrical appliance.

This may be average frequency of switch-on of the component over a period of time. This may be the number of times the component switches on in a fixed time period. This may be the average number of times the component switches on in the fixed time period, where the average is taken over a longer fixed time period. This may be the duty cycle (i.e. a time since the last switch off of the component) or average duty cycle. The feature set may comprise information relating to a duration of switch on time of one or more components of the electrical appliance. The feature set may additionally or alternatively comprise other information relating to an event during an operation cycle. The feature set may comprise an amount of power consumed over a period of time. The feature set may comprise an amount of power consumed at regular intervals during a time period identified using an event. The feature set may comprise a duration of an event. The feature set may comprise time of occurrence of an event within an operation cycle.

In an embodiment, a portion of the power consumption data may be analysed at regular time intervals. The feature set corresponding to the current time interval may be compared with: a feature set generated for a previous time interval, or to a stored pre-determined feature set for example. The time interval may be a 24 hour period. An average feature set for a 24 hour period may be generated from multiple feature sets for a number of periods within the 24 hour period for example. For example, a feature set comprising one or more features for each 5400 second period in 24 hours may be generated. The average value of each feature is then determined. The final feature set corresponds to the average value of each feature for the 24 hour period.

Alternatively, the power consumption data may be monitored for an event, and a portion of data identified corresponding to the event is then analysed. The feature set corresponding to the current portion of data is then compared with a feature set generated for a previous event or a stored pre-determined feature set for the event.

Monitoring for an event may comprise monitoring the power consumption signal for a change in magnitude greater than a threshold value for example. The threshold value depends on the appliance and may be pre-selected or determined and then stored in the in-line device. In an embodiment, a change is detected by calculating the difference between adjacent power samples in the real power time series signal, referred to as the deltapower. When the deltapower value exceeds the threshold value, an event is detected. Alternatively, an event may be detected only if the sum of the deltapower values within a specified time window exceeds the threshold value for example.

The time window again may be appliance dependent. In an embodiment, the time window is 600 ms. In an embodiment, where the utility consumption signal comprises a split or three phase electrical signal, monitoring for a change in the magnitude of the input signal may comprise monitoring the power consumption signal corresponding to each phase, where a change detected in any of the signals is registered as a change. When a change is detected, a portion of the power time series signal comprising the detected change in magnitude is extracted and stored, and a feature set comprising one or more features extracted.

For example, a kettle has only two states (on or off) with a power draw between 100 and 2000 watts in the on state for example, therefore the event detection threshold (to analyse the signal at the processor 204 or upload information to the cloud, via the communications module 209 for analysis) may be set to a value within this range, for example at 800 Watts or 300 Watts. For a washing machine, which has various low power components, the threshold may be set at the minimum possible value corresponding to an event (determined from historic or model data). In an embodiment, this threshold is 10 Watts. Other appliances may have different thresholds depending on their operational states and power consumption. The threshold value for the appliance is stored in the in-line device, optionally in the memory 205.

The comparison data (i.e. the data to which current measurements are compared against) may be generated using one or more feature sets previously generated using power consumption data from previously measured current and voltage. Alternatively, a pre-determined feature generated by the manufacturer for the particular appliance model may be used for example. Optionally the pre-determined feature is received via the communications module 209.

By comparing the feature sets it is possible to identify a decrease in performance, or an appliance fault when a difference between the value of a feature in the current generated feature set and the value of the feature in the comparison data passes a threshold difference for example. Alternatively, comparing the feature sets may comprise identifying a decrease in performance, or an appliance fault when the value of a feature in the current generated feature set passes a threshold value for example (i.e. falls below a minimum threshold, or rises above a maximum threshold). Alternatively, comparing the feature sets may comprise identifying a decrease in performance, or an appliance fault when the value of a feature in the current generated feature set does not reach a target value for example (i.e. does not reach a maximum value or does not drop to a minimum value).

Optionally, the in-line device is configured to extract a particular type of data, i.e. one or more particular features from the power consumption data depending on the appliance connected to the output connector. The in-line device may also comprise stored information specific to the particular appliance or appliance type used for comparing this data against.

In a further embodiment the processor 204 is configured to determine the status of the appliance (for example whether the device is "on" or "off"). This could be determined based on the configuration of a switch (e.g. relay 202—"on" or "off"). The status may additionally be determined based on readings from the current and voltage sensors 206 and 207. From this information the in-line device can determine whether the appliance is drawing any current or power from the power supply and therefore the status of the appliance.

In one embodiment the status of the electrical appliance is determined by comparing the power consumption data (e.g. the real power) with a known reference waveform. By determining the similarity between a known reference waveform and the current power consumption data the processor 204 is able to determine the current status of the appliance. Alternatively the power consumption may be compared to a threshold. For example where the appliance has two statuses (e.g. "on" and "off") a determination of appliance status is made by comparing the power data to a value or a threshold (e.g. a value of the current consumption during the 'on' state).

Optionally the in-line device transmits this information via the communications module 209.

By way of example, the in-line device could be connected to a fridge or freezer to analyse and store the power consumption information of the fridge or freezer over time, here-in-after referred to as extracting and storing a feature set. When, for example, the fridge or freezer seal starts to wear and fails to seal the appliance door properly, the ingress of warmer air into the appliance increases the internal temperature quicker than when the seal was intact. The internal thermostat triggers the appliance compressor to switch on more frequently to compensate for the increase in temperature. This variation in the electricity consumption pattern would initially be subtle but would eventually be significant enough to differentiate from normal operation. Since the in-line device has a history of the appliance's power cycles and patterns it is able to generate an alert or raise an alarm indicating that the fridge may need servicing.

During a normal operation cycle the fridge or freezer turns on the compressor motor at intervals depending on the temperature requirements of the appliance. These regular intervals and their occurrence during the day and night are recorded and stored. The turn-on cycles are then compared to the feature sets collected during the previous years of operation. Should the appliance door seal start to fail and leak warm air into the appliance, the compressor motor is forced to turn on more regularly in order to maintain the desired temperature. This is known as the switch on frequency. Typically, for a domestic fridge or freezer, the data shows that the switch on frequency increases over time, however if the appliance is performing well, the increase in switch on frequency is typically less than 1 minute over the course of a number of years. When a door seal starts failing the motor is turned on more frequently, typically 2 to 3 minutes earlier than the same cycles in the previous years of operation. This depends on the severity of the seal failure.

FIG. 10 shows a method of condition monitoring of an appliance which may be implemented by an in-line device according to an embodiment. The data measured by the current and voltage sensors 206 & 207 is input to the processor 204 in S1, which determines the power consumption data in S2 as has been described previously (for example by determining real power, apparent power and RMS power signals).

A feature set comprising one or more features is then extracted from the power consumption data. In this example, the feature set comprises information relating to a switch-on frequency (for example average number of times the component switches on in a fixed time period and/or a duty cycle) of the compressor motor in the device. The information may comprise the average number of times the compressor switched on in a 5400 second period, the average being taken over the last 24 hours for example.

Although the following example describes using information relating to switch on frequency, additionally or alternatively the duration of each switch on period may be used as a feature, for example. In this case, an increase in the duration as identified using the benchmark data indicates a fault in the seal. Features of the power consumption data could also be used to indicate an increased likelihood of a fire occurring due to a fault in the fridge.

The processor is configured to extract information relating to the compressor switch on times from the power consumption data. Each compressor switch on event is identified from the power consumption data in S3. The compressor event for a particular appliance may be identified by an increase in magnitude greater than a particular threshold, where the threshold is set for the particular appliance for example. A compressor can consume anything between 20 W and 2000 W depending on the type of appliance. The threshold may be set in this range for example. An event identified in any of the real power, apparent power and RMS power signals may be counted as an event for example. Similarly, an event identified in any of the two or three phase signals may be counted as an event for example.

A time stamp corresponding to the switch on time is stored for each identified switch on event. The switch-off time may also be recorded. This time stamp data is then used to determine information relating to a switch on frequency. For example, the processor may determine how many times the compressor switched on during each 5400 second period over the last 24 hour period from the time stamps, and then take the average of these. Thus in S4, the number of switch-on events in each 5400 second time period is determined. In S5, the average is taken from all of the 5400 second time periods in the previous 24 hours. This average value is the extracted feature. Thus in this example, the processor 204 is configured to extract one feature relating to the switch-on frequency for every 24 hour period. Alternatively, the processor 204 may determine the average number of times that the compressor switches on during a 24 hour period, the average being calculated as a rolling average over a number of days, for example 7 days. In this case, there is still one value extracted every 24 hours, however the value corresponds to the number of times the compressor switches on during 24 hours. In this example, the feature set is thus generated regularly, for example every 24 hours.

Additionally, one or more of the average power consumed (real, apparent and RMS power), the power factor, the Fourier transform of the on-cycle, the Fourier transform of a period (e.g. 500 ms) before turn-on and the Fourier Transform of a period (e.g. 500 ms) after turn-off may be recorded.

The processor 204 may then compare the current value of the switch-on frequency information (e.g. corresponding to the current 24 hour period) to a bench mark value in S6, which may be a value calculated during a previous time period, or simply be a stored value or table of values for the model (which may be stored on the plug device or externally for example). For example, the processor may compare the average value corresponding to the current 24 hours to the average value generated for the same 24 hour period in the previous year. If the value differs from the benchmark by an amount greater than a threshold then a fault in the seal of the door is identified. In an embodiment, the threshold is 0.15 on the Z-score scale (normalized standard deviation), corresponding to 15%. If the present value increases by more than 15% of the benchmark value from the benchmark value, then a fault in the seal is identified.

Once detected, information indicating that a condition has been met (e.g. there is a fault, there is a fire or there is an increased likelihood that a fire is about to occur) is transmitted via the communication module 209.

Although the above described method is used for condition monitoring a fridge, it is emphasized that condition monitoring could also be used to monitor for any particular characteristic (such as a known fault) when the in-line device is attached to a heating, ventilation and/or air conditioning system, or to a boiler, immersion heater, heat pump or boiler pump for example.

Although in the above described method, condition monitoring of the appliance is performed on the in-line device, alternatively, data may be transmitted from the in-line device and the monitoring performed remotely. For example, the condition monitoring may be performed using cloud infrastructure. In this case, current and voltage data may be continuously transmitted from the in-line device. Alternatively, power consumption data may be generated on the in-line device, and transmitted. Data may be transmitted at regular intervals, in response to a request, or in response to a detected event in the power signal for example.

FIG. 11 shows a method implemented by an in-line device according to an embodiment in which the processor 204 instructs a control module to change a status of the electrical appliance based on an output of a sensor. In this case, the sensor is the current sensor 206 and the voltage sensor 207. The processor 204 instructs a change in the status of the electrical appliance, via the first communication module 208 or the relay as described above, based on the output of the condition monitoring. In this method, the in-line device performs condition monitoring as has been described previously. Current and voltage data measured at the sensors in S1101 is used to identify a feature indicating a fault, or a developing fault in the appliance in S1102, as has been described in relation to FIG. 10.

In S1103, the processor 204 instructs the relay 202 to transition from the first configuration to the second configuration in response to identifying a characteristic as part of condition monitoring (e.g. a decrease in performance or a fault, or oncoming fault, a fire, or an oncoming fire in the electrical appliance). The in-line device is configured to configure the switch to an 'off' position once a condition (such as a fault) has been identified. Alternatively, the processor instructs a change in the status of the electrical appliance via the first communication module 208 as has been described previously.

Optionally, the in-line device is configured to change the status of the electrical appliance if a characteristic in the power measurements has been identified and a communication link (e.g. an active Wi-Fi connection) doesn't exist. Where a communication link (e.g. an active Wi-Fi connection) does exist, information relating to the fault is instead transmitted through the communication link.

FIG. 12 shows a method of determining a device type according to an embodiment. The below described method is suitable for use in any of the in-line devices discussed above where the device or appliance type is to be determined.

In step S41, an appliance operation signal comprising information relating to operation of an appliance is obtained. The signal may comprise an input current signal i(t) and/or an input voltage signal v(t) for example. The voltage and/or current signals may comprise data generated by the current sensor 206 and/or the voltage sensor 207.

In an embodiment, sampling is performed at a sampling frequency of greater than or equal to 1 kHz. Sampling at 1 kHz results in 20 samples per mains cycle, where the mains frequency is 50 Hz.

Further processing of the input current and/or voltage signals may be performed to generate one or more appliance operation signals from the input current and/or voltage signals. For example, a total power consumption metric may be obtained, for example real power, apparent power and/or RMS current. This may be obtained for windows corresponding to a plurality of samples in the input signal for example.

This processing, and the subsequent steps S42 to S46 may be performed on the processor 204. Alternatively, one or more of steps S42 to S46 may be performed on a processor located remotely from the device, for example on a cloud computing system. In S42, the appliance operation signal is monitored for a change in magnitude. A step detection algorithm may be performed, for example, using a total power consumption metric (e.g. power or RMS current). Once a step is detected, referred to as an event, a portion of the signal corresponding to the event may then be extracted for further processing. The events may be extracted in portions of fixed or varying duration. For example, a pre-event portion of fixed duration and a post-event portion of fixed duration may be extracted corresponding to the event each time a change in magnitude is detected. The portion may be extracted for one or more of: an input current signal, an input voltage signal, a power signal (e.g. real power and/or apparent power), and an RMS current signal.

When a change in magnitude has been detected in e.g. the power signal, a further step of detecting for a change in the frequency data may also be performed. In an embodiment, a change in magnitude is detected if a change greater than a threshold value is detected. In an embodiment, the threshold is 10 Watts.

Once a change in magnitude has been detected, data corresponding to the event portion may then be generated in this step. The data may comprise current and/or voltage signals corresponding to the event portion (with or without background removed), RMS current or power signals corresponding to the event portion (with or without background removed), aggregate values (such as total real power change for example), and/or frequency data (such as harmonic magnitude values).

Further criteria may be applied during step detection, for example, changes in real power level that exceed a threshold and are preceded and followed by quiet periods of low variance may be detected as events. These detected steps may then be extracted in windows of varying duration, dependant on the time taken for the signal to settle into a low variance regime.

In an embodiment, a change is detected by calculating the difference between adjacent power samples in the real power time series signal, referred to as the deltapower. When the deltapower value exceeds a threshold value, an event is detected. Alternatively, an event may be detected only if the sum of the deltapower values within a specified time window exceeds a threshold value for example.

In an embodiment, where the utility consumption signal comprises a split or three phase electrical signal, monitoring for a change in the magnitude of the input signal may comprise monitoring each phase, where a change detected in any phase is detected as an event. This may comprise generating one or more of the corresponding real, apparent or RMS current signals from each pair of current and voltage signals, and monitoring each. A change detected in any of the signals is registered as a change.

Once an event has been detected, data corresponding to the event may then be generated and used for event identification.

The data depends on the nature of the monitored signal. For example, where the signal is measured by an in-line device connected directly to an appliance such as a kettle, the data may simply be a power change value between the post-event portion and the pre-event portion. Where the signal corresponds to operation of an appliance having multiple components the data may comprise a vector of extracted features, or several time series of extracted data for example.

A background removal step may be performed at this stage. For example, when the event is an "on-set" (i.e. a device switching on, where the change in magnitude is positive) the pre-event portion may be subtracted from the post-event portion before features are extracted. When the event is an "off-set" (i.e. a device switching off, leading to a negative change in magnitude) then the post-event portion may be subtracted from the pre-event portion.

A mean current cycle value may be generated, for example by calculating the mean current value for each discrete time location in the current cycles in the pre-event portion for an on-set event (or the post-event portion for an off-set event), resulting in a mean current vector which is representative of the background. Removing the background then involves subtracting this mean current vector from the current vector of each cycle of the post-event signal portion (or the pre-event signal portion for an off-set event). The process may additionally or alternatively be performed for a power signal corresponding to the event signal portion for example (e.g. real power signal, apparent power signal).

Frequency data corresponding to the event may also be extracted in this step, for example amplitude values for one or more harmonic frequency components. Background removal may also be performed on the frequency data. For example, the pre-event current and voltage signals may be converted into the frequency domain using a Fast Fourier Transform (FFT) algorithm, and the post-event current and voltage signal converted into the frequency domain using the same FFT. The resultant peaks of the pre-event are then subtracted from the post event peaks (for an on-set event) to give resulting frequency data corresponding to one or more harmonic magnitude values. The post-event peaks are subtracted from the pre-event peaks for an off-set event. The amplitude value corresponding to a plurality of harmonic frequencies, wherein the harmonic frequencies are the positive integer multiples of the fundamental frequency of the appliance operation signal, may be extracted for example. The fundamental frequency for the case of an electrical signal corresponds to the mains frequency, which is 50 Hz in the UK and 60 Hz in the US for example. In this step, a change of magnitude in the input data is detected as an event. Data relating to the event portion, for example generated from the signal data from before and after the event, is then generated.

In S43, the event is identified from the data generated in S42. This may comprise simply applying one or more stored rules. For example, where the signal is measured by an in-line device connected directly to a single appliance such as a kettle, the data extracted in S42 may simply be a power change value between the post-event portion and the pre-event portion. In S43 it may be determined whether the power change is greater than a threshold value. If it is greater than the threshold, the event is identified as a kettle switch-on event.

Alternatively, the data relating to the event extracted in S42 may be inputted into a second algorithm for example. The second algorithm may comprise a second classifier configured to output a probability corresponding to each of a plurality of events. The event may then be identified as that with the highest probability for example. Alternatively, some further processing may be performed to identify the event, for example taking into account data from previous events. Where a single appliance is being monitored, events relating to multiple components in the appliance may be identified for example, such as 'door lock start' for a washing machine. Where multiple appliances are being monitored, events relating to different appliances and different components within appliances may be identified.

Thus in step S42, a classifier input is generated corresponding to the event. In S43, the input is inputted into the second classifier. The second classifier may be a machine learning based classifier that is trained prior to implementation. The training stage will be discussed later.

The second classifier may generate an event probability value for each of one or more appliance or appliance component state changes. The event probability value is the probability that the event portion of the signal corresponds to the change in state of the appliance or component.

The classifier input is obtained from the signal data in S42, for example the data time series themselves may be directly input to the second classifier (for example the current, voltage, RMS current and/or power time series, with or without background removed) or further processing may be applied to the time series before inputting to the second classifier (for example buffering/stretching, normalising, etc). Alternatively, a one-dimensional feature vector of values may be generated in S42, comprising for example a power change value, frequency data such as harmonic magnitude values for the current and/or voltage, real power values and/or apparent power values. This feature vector may then be input into the second classifier.

For a split phase (or dual phase) signal comprising two current signals and two voltage signals, features may be generated corresponding to each phase. Similarly, for a three phase signal comprising three current signals and three voltage signals, again features may be generated corresponding to each phase.

The second classifier may be a neural network based classifier for example. For example, where a feature vector is generated corresponding to the event in S42 (comprising for example a real power values, apparent power values and one or more harmonic magnitude values for current and voltage), this feature vector is then input into the second classifier comprising an artificial neural network (ANN) in S43.

Each node in the input layer of the ANN computes a weighted sum of all of its inputs (being each of the features in the feature vector) and an additive bias term, and then applies an activation function to the result. The outputs of each layer are then fed as the inputs to the subsequent layer. Each node again computes a weighted sum of all of its inputs (being the outputs of each node in the previous layer) and an additive bias term, and then applies an activation function to the result. Each node in the final layer outputs a value into the vector of probabilities, where each probability in the output vector corresponds to the probability that the event corresponds to a particular appliance or appliance component state change. The weights and biases are the trainable parameters, the values of which are learned during the training stage (as described later).

A convolutional neural network (CNN) may be used where two or more 1-dimensional time series are taken as input. CNNs are a class of neural network that include one or more convolutional layers. A convolutional layer comprises a set of linear filters, each characterised by a weights vector, and an additive bias term per filter. During operation each filter is convolved across the input data time series.

The list of appliance and/or component state changes, which correspond to classes and sub-classes in the second classifier, and the corresponding event probability values outputted from the second classifier may be converted to an event identification, for example by selecting the state change corresponding to the highest probability or by performing some further processing based on the previously identified state changes.

In S44, it is determined whether the component event is a designated sequence start component event. The event identified in S43 may be compared to a stored list of designated sequence start component events for example. For example, a list of one or more sequence start component events for the appliance may be stored where a single appliance is monitored. A list of one or more sequence start component events for a number or appliances and/or appliance components may be stored where multiple appliances and/or components are monitored.

If it is determined not to be a designated sequence start event in S44, it may be determined whether it is an end event for example. If so the feature vector, may still be populated. If the system can't determine what the event is then it is ignored.

Steps S44 and S43 are described as separate steps, however, in practice a single processing step may be performed that identifies the component event corresponding to the change and whether it is a designated sequence start event.

If the component event is determined to be a designated sequence start component event in S44, in S45, one or more features from the input appliance operation signal between the sequence start component event and a sequence stop point are extracted.

For example, in this step, it may be monitored for any further change in magnitude, in the same manner as described in S42. A step detection algorithm may be performed such as described previously in S42. Once a step is detected, referred to as an event, a portion of the signal corresponding to the event may then be extracted, in portions of fixed or varying duration. Data corresponding to the event may then be generated and used to identify the event, as has been described previously in relation to S43.

Again, the data extracted depends on the nature of the monitored signal. For example, the data may simply be a power change value between the post-event portion and the pre-event portion, or a vector of extracted features, or several time series of data for example. Again, a background removal step may be performed as described previously. The further event is then identified. This may be done in the same manner as described in S43, for example using the second classifier.

It is then determined whether the component event is a sequence stop point. The event may be compared to a stored list of designated sequence stop component events for example. If the event is not a sequence stop component event, then it is monitored for a further change in magnitude, and the process iterates until a sequence stop event is found. Features corresponding to each event may be stored, for example in a feature table 1201.

In an embodiment, for each event in the sequence (including the start event and any end event) a fixed number of features are extracted corresponding to the event. Thus a fixed-length feature vector corresponding to each event in the sequence is extracted. The features may be the same as those extracted to identify the event for example.

For different appliances, there may be a different number of events in the sequence. Thus a different number of feature vectors may be extracted for different appliances. However, the length of each feature vector will be the same. Thus for the feature table 1201, the number of rows will depend on the appliance, but each row comprises the same number of columns.

For example, the feature vector may comprise time location information of the event in the sequence (where the sequence start component event is taken as the zero point). Thus for the start event, the feature vector comprises a zero time stamp, and for each subsequent event the feature vector comprises a time stamp value. The time location information may be relative to a start time of the sequence start component event. For each identified component event in the sequence (including the start event and any stop event) the feature vector may comprise a start time of the component event and a stop time of the component event. The time information may be in milliseconds for example. The start time may be in date and time format, and is the reference to all deltas for that appliance.

In an embodiment, the feature vector for each event in the sequence may comprise one or more of the features extracted for each event in order to identify the event as described above in relation to S42. For example, data time series (for example the current, voltage, RMS current and/or power time series (real and/or apparent for example), with or without background removed), data time series with further processing applied (for example buffering/stretching, normalising, etc), aggregate values (such as power change values for the event), and/or frequency data such as current and/or voltage harmonic magnitude values for the event may be included for example. In an embodiment, the features comprise voltage, current and their harmonics and transients for a portion of the signal corresponding to the event, real and apparent power and their harmonics and transients for a portion of the signal corresponding to the event, current and voltage trajectories (IV trajectories) for a portion of the signal corresponding to the event, and any other relevant information relating to each event in the sequence (i.e. between the sequence start component event and the sequence stop point, including the start event and the stop event if any). In an embodiment, the same feature vector used as input to the second classifier for each event is also used as input to the first classifier.

In S46, a feature vector comprising the one or more features is inputted into a first algorithm which outputs information relating to the type of appliance connected to the in-line device. In this step, a probability that the appliance corresponds to an appliance type or model may be determined, by applying a first algorithm, for example comprising a first classifier, to the one or more features. Each probability corresponds to the probability that the appliance corresponds to a particular appliance type or model.

The first algorithm may comprise an artificial neural network for example. The feature vector for each event in the sequence (the start event through to the stop point) may be inputted to the first algorithm in the same step (in parallel). For example, the input to the first algorithm may comprise a 1D vector, which comprises the feature vectors corresponding to each event combined, for example concatenated together. In other words, the feature table 1202, comprising a fixed length feature vector corresponding to each event in the sequence, is flattened into a 1D feature vector.

Different appliances may have different numbers of events in the sequence. During training, a maximum number of events may be determined, corresponding to a maximum input length. Where an appliance sequence comprises fewer events than the maximum, the 1D vector is padded to give a fixed length for each input. The padding depends on the number of rows, so that the input length is fixed.

This 1D feature vector is then input into the first algorithm comprising the artificial neural network (ANN). Each node in the input layer of the ANN computes a weighted sum of all of its inputs (being each of the features in the feature vector) and an additive bias term, and then applies an activation function to the result. The number of nodes in the input layer corresponds to the length of the input 1D vector. In an embodiment, there are 144 nodes in the input layer.

The outputs of each layer are then fed as the inputs to the subsequent layer. Each node again computes a weighted sum of all of its inputs (being the outputs of each node in the previous layer) and an additive bias term, and then applies an activation function to the result. There may be two hidden layers for example.

Each node in the final layer outputs a value into the vector of probabilities, where each probability in the output vector corresponds to the probability that the appliance corresponds to a known appliance type. The output layer may apply a softmax function for example. The number of nodes in the output layer corresponds to the number of appliance types+1. In an example, there are nine nodes in the output layer.

The weights and biases are the trainable parameters, the values of which are learned during the training stage (described later).

The output of the neural network is a vector of probabilities, having a length corresponding to the number of appliance types+1. In an embodiment there is an additional entry which corresponds to "no match". Each output is a float number between 0 and 1, representing the probability of a match to that entry, with the sum of all outputs being 1.

The probabilities output by the first classifier may be normalized. The highest probability value may be compared to a threshold value for example to determine whether the appliance is present within the set of known appliance types.

A further criteria may be specified to determine whether the appliance is present within the set of known appliance types, for example, that a positive result is returned a certain number of times.

Alternatively, the feature vectors corresponding to each event may be inputted sequentially, using an LSTM (Long short-term memory) neural network for example.

In the above described method, the first algorithm is configured to output a vector of probabilities, where each probability in the output vector corresponds to the probability that the appliance corresponds to a known appliance type or model, and there is an additional entry in the vector corresponding to the probability that the appliance doesn't correspond to any of the known appliance types.

The machine learning algorithm used for determining the appliance type is trained using real data. The real data is collected through various means such as a Non-Intrusive Load Monitoring (NILM) device installed at the electricity cabinet of various homes and/or a number of appliances installed in a lab, which are also equipped with NILM devices.

Figure 13:
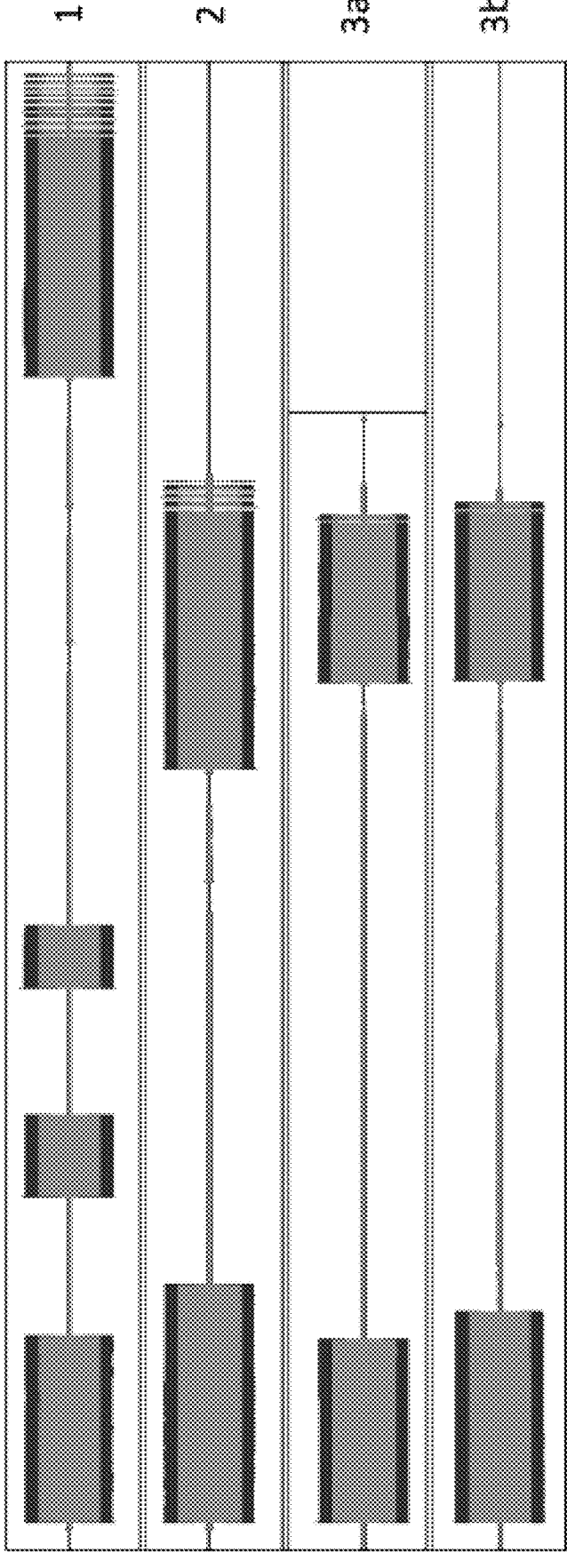
FIG. 13 shows example signatures from a number of different dishwashers.

FIG. 13 shows signatures from a number of different dishwashers (1, 2, and 3a). 1 and 2 represent signatures from different dishwasher models while 3a and 3b are from the same make and model but running at different cycles. The collected data is aggregated into one dataset and annotated accordingly. The annotation is carried out for example by a minimum of two trained individuals linking the appliance or model type to relevant labels, categories, etc. such as, by way of example only, the identity of devices, the model number and its complete feature vector. The feature vector may be made up of time stamps, standard deviation and Euclidean distances on various runs of the same cycle or program, etc., as depicted in the feature table 1201. The standard deviation and Euclidean distance refers to how much the feature vectors differ from the training data, both in deviation (2D) or Euclidean distance (3D). The latter takes the 3rd dimension in the form of time, therefore can be seen as deviation plotted against time. These metrics may be included in the feature vector, or simply used to identify outliers for example. Both individuals may use a common, purposely built annotation tool where the results are compared to ensure equivalence and any discrepancy corrected. This results in a laboriously annotated reference dataset with negligible or no observed variation, avoiding an inter-rater reliability study for example. The feature table 1201 shows an example vector, comprised of a log of times at which various components within the appliance have switched on and off. The feature table 1201 shows part of an example feature vector of a washing machine, where the starting point or on state of the washing machine is determined by the locking of the washing machine door. This also initiates the appliance's feature vector. Subsequent entries may overlap depending on their on-duration such as the 'water valve open' entry in the same table. These timed entries also contain the various signal information in the feature list which may be composed of, by way of example only, voltage, current and power harmonics, transients, standard deviation and Euclidean distances on various runs of the same cycle or program, etc. The feature vector may comprise information relating to when various components have switched on and/or the duration that these components are on for.

Such features can also be stored for known appliance types, and this information may be compared to the appliance feature vector being assessed. Given such a feature vector, the whole cycle of the appliance may be reconstructed with some data loss from the feature vector information only.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A control and monitoring device integrated in a switch disconnector, said switch disconnector being configured to couple an electrical appliance to a power supply, said control and monitoring device comprising:

a control module configured to change a status of the electrical appliance, wherein the control module comprises a switch configured to connect the power supply to the electrical appliance in a first configuration and disconnect the power supply from the electrical appliance in a second configuration;

a sensor configured to monitor a condition of said electrical appliance and/or an environment thereof, wherein the sensor comprises a voltage sensor configured to measure a voltage supplied through the switch disconnector to the electrical appliance, and a current sensor configured to measure a current supplied through the switch disconnector to the electrical appliance; and a processor configured to:

obtain data from the voltage sensor and the current sensor;

monitor the performance of the electrical appliance by repeatedly generating a set of one or more features using the obtained data and comparing each generated feature set to comparison data to identify a fault in the electrical appliance, wherein the feature set comprises one or more of: information relating to a switch-on frequency of one or more components of the electrical appliance, information relating to a duration of switch on time of one or more components of the electrical appliance, information relating to an event during an operation cycle, an amount of power consumed at regular intervals during a time period identified using an event, a duration of an event, frequency data, and a time of occurrence of an event within an operation cycle; and instruct the control module to change a status of the electrical appliance from the first configuration to the second configuration in response to identifying a fault in the electrical appliance.

2. The device according to claim 1, wherein the frequency data comprises harmonic magnitude values.

3. The device according to claim 1, wherein the device further comprises a communication module configured to transmit data and wherein, in response to identifying a fault, the processor is further configured to instruct the communication module to begin transmitting data.

4. The device according to claim 1, wherein the device further comprises a communication module configured to transmit data, and wherein, upon identifying a fault, the processor is further configured to:

instruct the communication module to transmit data if a communication link exists; and instruct the control module to change a status of the electrical appliance to a power off status if a communication link does not exist.

5. The device according to claim 1, wherein the processor is further configured to instruct the control module to change the status of the electrical appliance from a first status to a second status based on a demand response signal when the demand response signal indicates that a demand for electricity is greater than a supply of electricity.

6. The device according to claim 5, wherein the processor is further configured to:

determine a frequency of the power supply based on measurements from the voltage sensor and the current sensor; and generate the demand response signal when the frequency of the power supply is lower than a first predetermined value.

7. The device according to claim 6, wherein the processor is further configured to generate the demand response signal when a moving average of the frequency of the power supply is lower than the first predetermined value.

8. The device according to claim 6, wherein the processor is further configured to change the status of the electrical appliance from the second status to the first status in response to determining that the frequency of the power supply is greater than the first predetermined value.

9. The device according to claim 5, further comprising a communication module configured to receive the demand response signal.

10. The device according to claim 5, wherein the control module comprises a first communication module configured to transmit a control signal to the electrical appliance in response to receiving the demand response signal, wherein the control signal controls the operation of the electrical appliance.

11. The device according to claim 5, wherein the processor is further configured to:

determine whether a predetermined duration of time has expired since the demand response signal was received; and in response to determining that the predetermined duration of time has expired, change the status of the electrical appliance from the second status to the first status.

12. The device according to claim 11, wherein the predetermined duration of time is specified in the demand response signal.

13. The device according to claim 11, wherein the processor is further configured to:

measure a second duration of time between: changing the status of the electrical appliance to the second status in response to receiving the demand response signal, and changing the status to the first status from the second status; and determine an amount of energy shifted by responding to the demand response signal by measuring an energy consumption of the electrical appliance for the second duration of time after changing the status of the electrical appliance to the first status from the second status.

14. The device according to claim 1, wherein the device further comprises a communication module configured to transmit data and receive a signal, and wherein the processor is further configured to:

instruct the communication module to transmit the data from the voltage sensor and the current sensor; and instruct the control module to change the status of the electrical appliance based on a received signal.

15. The device according to claim 1, wherein the switch disconnector is a rotary isolator.

16. The device according to claim 1, wherein the electrical appliance is a heat pump or an air conditioning unit.

* * * * *